United States Patent
Martin

(10) Patent No.: US 7,055,994 B2
(45) Date of Patent: Jun. 6, 2006

(54) LIGHT SOURCE ASSEMBLY AND METHODS FOR AIRCRAFT EXTERNAL LIGHTING

(75) Inventor: John J. Martin, Gilbert, AZ (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 10/503,777

(22) PCT Filed: Feb. 13, 2003

(86) PCT No.: PCT/US03/04290

§ 371 (c)(1),
(2), (4) Date: Aug. 6, 2004

(87) PCT Pub. No.: WO03/068599

PCT Pub. Date: Aug. 21, 2003

(65) Prior Publication Data

US 2005/0093718 A1 May 5, 2005

Related U.S. Application Data

(63) Continuation-in-part of application No. 09/665,600, filed on Sep. 19, 2000, now Pat. No. 6,559,777.

(60) Provisional application No. 60/356,854, filed on Feb. 13, 2002.

(51) Int. Cl.
*B64D 47/02* (2006.01)

(52) U.S. Cl. ............... 362/470; 362/545; 362/547; 315/77

(58) Field of Classification Search ............ 315/76–77, 315/291, 307, 308, 246; 340/981–982; 362/459, 362/470, 543–547
See application file for complete search history.

(56) References Cited

U.S. PATENT DOCUMENTS 4,233,652 A * 11/1980 Oswald ............... 362/472

(Continued)

FOREIGN PATENT DOCUMENTS

EP 0 736 453 A2 10/1996

(Continued)

*Primary Examiner*—Thuy Vinh Tran
(74) *Attorney, Agent, or Firm*—Tiajoloff & Kelly

(57) ABSTRACT

An aircraft light assembly comprises a light apparatus configured to be supported in a space on the body of an aircraft. The apparatus has one or more light emitting diodes (13) generating visible light and an outer structure overlying the LEDs. The outer structure includes a light transmission portion through which visible light from the LEDs can pass, and a metallic portion with an outer surface exposed to the external airflow. A heat-transmitting connection thermally links the LEDs to the metallic portion so that heat from the LEDs flows to the outer surface and is dissipated to the external airflow. The light assembly is configured to be secured in a conventional socket for an incandescent navigation light bulb and to receive the electrical current supplied thereto by the aircraft electrical system. Civilian applications of the unit have only visible LEDs. When the unit is for a military aircraft, it has electric circuitry connected with a visible light source and an IR light source, and the electric circuitry is configured to process the input current from the socket and based thereon operate in either a visible mode or covert IR mode. Where the current is in one electrical state, such as for example a certain voltage, the electric circuit sends power only to the visible light source. When the current is in a different electrical state, e.g., a different voltage level, the circuitry sends power only to the IR source, and no visible light is emitted. Different input current voltages or characteristics are also used to cause the IR emitter to flash in various patterns that can be programmed into the unit. All control may be accomplished over a single pair of wires, as in existing systems that do not have IR mode capability. To upgrade existing aircraft, light source units a shaped to fit in the apertures for existing lenses over incandescent navigational fixtures.

85 Claims, 11 Drawing Sheets

| EXTERNAL LIGHTING INTENSITY SWITCH POSITION | VISIBLE EMISSION | COVERT (IR) EMISSION |
|---|---|---|
| 5 | CONSTANT | NONE |
| 4 | NONE | PATTERN 1, E.G., |
| 3 | NONE | PATTERN 2, E.G., |
| 2 | NONE | PATTERN 3, E.G., |
| 1 | NONE | PATTERN 4, E.G., |

U.S. PATENT DOCUMENTS

| | | | |
|---|---|---|---|
| 4,495,549 A * | 1/1985 | Carlson et al. | 362/470 |
| 4,733,335 A | 3/1988 | Serizawa et al. | 362/503 |
| 5,632,551 A | 5/1997 | Roney et al. | 362/485 |
| 5,677,603 A * | 10/1997 | Speirs et al. | 315/324 |
| 5,685,637 A * | 11/1997 | Chapman et al. | 362/263 |
| 5,702,171 A * | 12/1997 | Lenzi | 362/29 |
| 5,984,494 A * | 11/1999 | Chapman et al. | 362/470 |
| 6,045,240 A | 4/2000 | Hochstein | 362/294 |
| 6,244,728 B1 | 6/2001 | Cote et al. | 362/294 |
| 6,268,702 B1 | 7/2001 | Fleck | 315/185 R |
| 6,367,949 B1 | 4/2002 | Pederson | 362/240 |
| 6,375,340 B1 | 4/2002 | Biebl et al. | 362/294 |
| 6,559,777 B1 | 5/2003 | Martin et al. | 340/981 |
| 2001/0030866 A1 | 10/2001 | Hochstein | 362/294 |
| 2002/0008976 A1 | 1/2002 | Gronemeier et al. | 362/545 |

FOREIGN PATENT DOCUMENTS

| | | |
|---|---|---|
| GB | 2 337 645 A | 11/1999 |
| WO | WO 98/21917 | 5/1998 |
| WO | WO 00/71417 | 11/2000 |

* cited by examiner

| EXTERNAL LIGHTING INTENSITY SWITCH POSITION | VISIBLE EMISSION | COVERT (IR) EMISSION |
|---|---|---|
| 5 | CONSTANT | NONE |
| 4 | NONE | PATTERN 1, E.G., — — — — — |
| 3 | NONE | PATTERN 2, E.G., — — — — |
| 2 | NONE | PATTERN 3, E.G., — — — |
| 1 | NONE | PATTERN 4, E.G., — — |

LIGHT SOURCE ASSEMBLY AND METHODS FOR AIRCRAFT EXTERNAL LIGHTING

This application is a national phase application under 35 U.S.C. 371 claiming the benefit of PCT/US03/04290 filed on Feb. 13, 2003 a continuation-in-part of U.S. patent application Ser. No. 09/665,600 entitled DUAL MODE LIGHT SOURCE FOR AIRCRAFT EXTERNAL LIGHTING filed on Sep. 19, 2000 by inventors John J. Martin and Cary H. Leach, which issued as U.S. Pat. No. 6,559,777 B1 on May 6, 2003 and is a CIP of 60/356,854 filed on Feb. 13, 2002 and herein incorporated by reference.

FIELD OF THE INVENTION

This invention relates to navigation light sources provided for aircraft that are used to render the aircraft visible, and more particularly to navigation lights for civilian or military aircraft that use light emitting diodes (LEDs) to generate visible light. The invention also relates to apparatus and methods of upgrading the navigation lights of existing aircraft.

BACKGROUND OF THE INVENTION

The aviation authorities of many countries require that commercial aircraft, and also military aircraft, when in civilian airspace on non-covert activities, have navigational lighting to improve their visibility at night. Under U.S. regulations, when any aircraft (military or civilian) is flown during darkness in unrestricted airspace or in a military operations area (MOA), the external lighting of the aircraft must conform to FAA requirements for chromaticity ('color'), luminous intensity ('brightness'), and angular coverage. Generally, the navigation lighting comprises red lights on the left side and green lights on the right side of the plane, and this external lighting normally is provided by incandescent light bulbs in sockets on the outside of the plane, conventionally powered by electricity from the internal electronics of the aircraft.

The lifetime of incandescent lamps, especially in military aircraft exterior lighting applications, is limited, and replacement of incandescent lamps in the exterior lighting fixtures of vehicles, in particular aircraft, is a frequent maintenance task. For example, interviews of squadron maintenance personnel indicate that the average lifetime of incandescent lamps in the main left and right navigation light fixtures in F-16 aircraft is approximately 75 hours. A means of increasing the reliability of exterior light sources while maintaining levels of luminous intensity required to meet Federal Aviation Administration (FAA) regulations is therefore needed.

Compared to conventional incandescent lamps, light emitting diodes (LEDs) contain no filaments and can theoretically provide lifetimes measured in thousands of hours. Also, LEDs are far more efficient in converting electrical energy into light energy. However, LEDs are not perfect converters of electrical energy into light energy, and some energy always will be lost as waste heat.

This creates a problem for possible use of LEDs in aircraft navigation lighting, because the heat created increases the temperature of the LEDs, and, for a given drive voltage, the hotter an LED gets, the less light that LED emits. The problem is even greater in the area of navigation light aviation applications, because to achieve luminous intensity levels conforming to FAA/ICAO regulations a number of high intensity LED diodes (individual light emitters) must be integrated and co-packaged. However, the added LEDs generate substantial heat, which elevates the temperature of the LEDs. This elevated temperature in turn tends to reduce the intensity of the light. Sufficiently high temperatures will ultimately degrade the LEDs so that they either go out entirely, or function at a greatly reduced illumination level. Use of LEDs in aircraft light systems is consequently subject to problems of overheating.

As mentioned above, military aircraft are required to have visible navigation lights similar to those of civilian and commercial aircraft. When flying a wartime night mission or night training sortie, a military aircraft may transit through unrestricted airspace in which civilian aircraft also operate, and it must have aircraft external lighting that conforms to FAA requirements during this transit. However, during night flight operations in wartime conditions, or during night flight training in restricted airspace, aircraft external lighting that is visible to the unaided eye is undesirable.

For military aircraft in covert activities or other military situations where visibility would be a disadvantage, one approach was for the pilot of the military aircraft to simply turn off the external lighting. The pilot can adjust the intensity of the navigation lights, or turn them off completely, with a brightness control dial in the cockpit hat varies the voltage of the AC current sent to the light socket.

In recent years, however, it has been noted that, in covert activities, while the aircraft was not visible to the enemy, it was also not visible to friendly aircraft, and planes began to be supplied with covert mode IR light sources in addition to the visible navigational lights. In covert operation, only emissions in the near-infrared of appropriate intensity are used, and visible navigation light is not emitted. The IR light emitted is not visible to the unaided human eye, but can be seen with appropriate viewing equipment, e.g., night vision goggles (NVGs) that are utilized during night operations in many military aircraft, which are very sensitive to the deep red and near-infrared region of the spectrum.

To upgrade to covert IR capability making military aircraft external lighting to be selectable between visible and covert modes at will during flight, IR light sources have ordinarily been additional arrays of IR diodes added to the outside of the plane in addition to the existing navigational lights. Alternatively, filters have been mounted over the existing navigational lights and IR diodes mounted in the light bulb fixtures. These kinds of additions, however, require substantial structural work to create the mounts and to wire the new fixtures into the aircraft body, which usually does not have very much extra room for more wiring. In addition, the extensive modifications result in considerable expense for an upgrade to covert IR capability.

SUMMARY OF THE INVENTION

It is therefore an object of the present invention to provide a navigation light for aircraft that makes use of LEDs, but that avoids the heat-related problems of the prior art.

It is further an object of the invention to provide an LED light source that efficiently carries heat away from the LED source and radiates the heat to the environment outside of the aircraft.

It is also an object to provide such a system in a modular design that affords easy replacement of the lighting assembly, and also provides a relatively easy upgrade from existing navigation lights to the improved system, especially as an upgrade that does not require modification to the existing aircraft structure.

According to the invention, an aircraft light assembly is provided for an aircraft having a body with an outer surface exposed to an external airflow. The assembly comprises a light apparatus configured to be supported on the body of the aircraft and including one or more light emitting diodes generating visible light. The apparatus also includes an outer structure overlying the light apparatus. The Outer structure includes a light transmission portion through which visible light from the LEDs can pass, and a metallic portion with an outer surface exposed to the external airflow. The metallic portion secures the light transmission portion on the aircraft. A heat-transmitting connection thermally links the LEDs to the metallic portion so that heat from the LEDs flows to the outer surface and is dissipated to the external airflow.

Preferably, the outer surface of the metallic portion and the light transmission portion are configured so that the outer surface thereof is conformal to the outer contour of the aircraft body, at least on one edge, e.g. the leading edge of the assembly.

It is further an object of the invention to provide a method for installing an LED-based aircraft light assembly.

It is further an object of the invention to provide for a dual mode visible and infra-red aircraft light source for military aircraft that avoids the heat-related problems of the prior art.

It is also an object of the invention to provide a dual mode light source that provides for different flashing patterns of the infra-red emitter when in covert mode. Preferably, the different flash patterns are pre-programmable and selectable by existing controls without modification to the electronics of the aircraft.

It is also an object of the invention to provide an aircraft lighting system that can function both as a visible navigational light system and also as a covert IR light system for friendly eyes only. It is also an object of the invention to provide a design and method that allows for relatively easy upgrade of existing visible navigation lights to give an existing aircraft IR covert capability without the need for any substantial mechanical adaptation of the plane's structure.

These and other objectives are accomplished by providing according to an aspect of the invention a dual mode light source unit configured so that it can be secured into a conventional incandescent bulb socket on the aircraft. The light source has a connector portion that fits in the socket and receives the electrical current supplied thereto by the aircraft electrical system. The unit also comprises electric circuitry connected with the connector portion and a visible light source and an IR light source.

According to another aspect of the invention, the electric circuitry is configured to process the input current from the socket and, based thereon, operate in either a civilian, visible mode or a covert IR mode. Where the current is in one electrical state, such as for example a certain voltage, the electric circuit sends power to the visible light source. When the current is in a different electrical state, e.g., a different voltage level, the circuitry sends power only to the IR source, and no visible light is emitted. The electrical states of the current may be any variation of electrical parameters thereof, including amperage, voltage, frequency, or data encoded therein, etc.

Such a system allows for ready upgrade of existing aircraft because all control may be accomplished over a single pair of wires, as are already in existing systems that do not have IR mode capability. To upgrade, light source units according to the invention are simply inserted into the existing navigational light sockets.

Other objects and advantages of the invention will become apparent from the specification herein.

DETAILED DESCRIPTION

Figure 1:
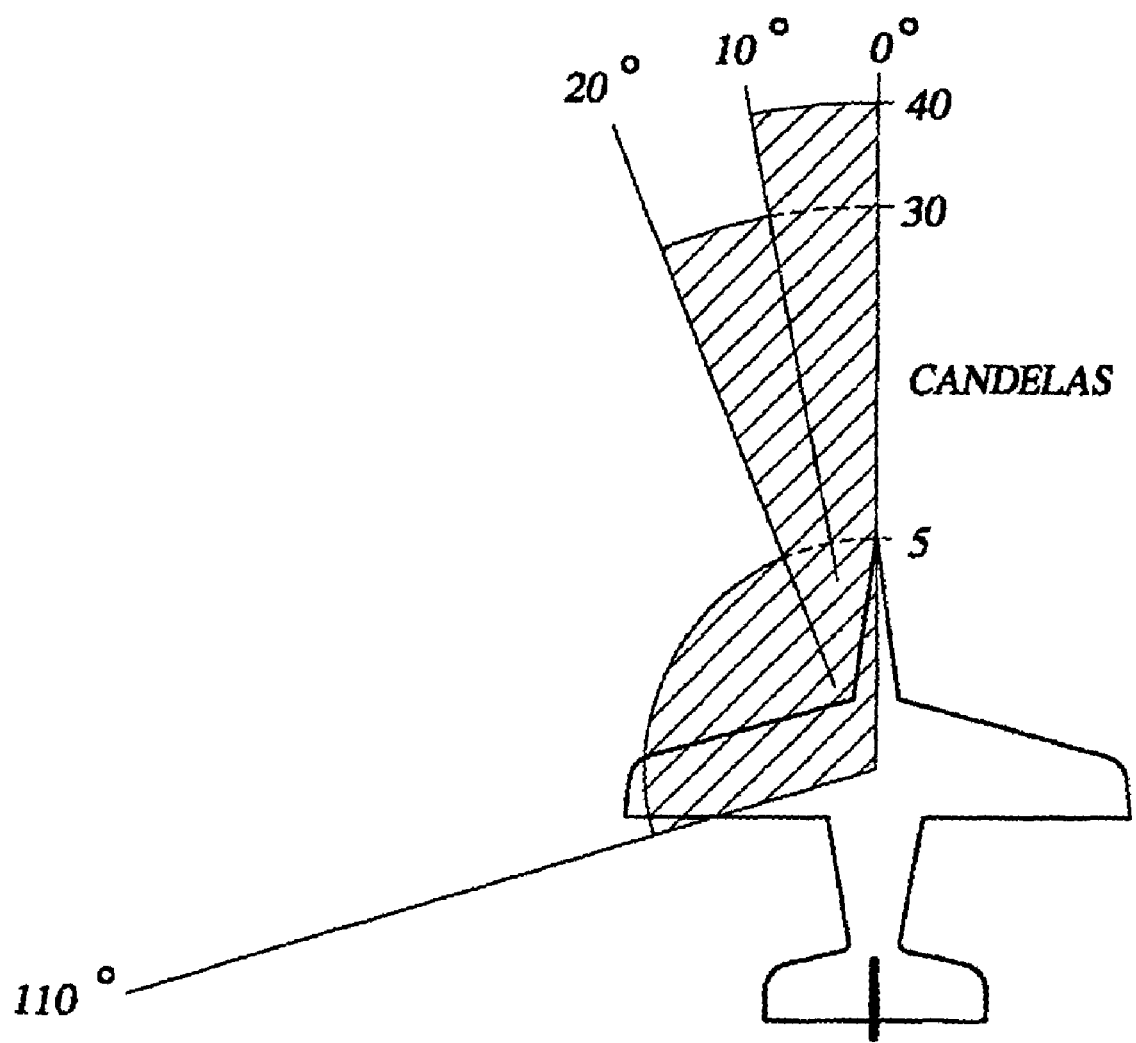
FIG. 1 shows a schematic top view of an aircraft graphically illustrating one of the placements for a navigational light and showing the required light intensity in varying angles, as required by the FAA.

Referring to FIG. 1, all aircraft flying in civilian airspace are required to be equipped with visible navigational lights to allow them to see each other at night or in conditions of bad visibility. The FAA has defined the parameters for acceptable navigational light intensity based on the angle of viewing thereof. A navigational light on top of an aircraft must project at least 40 candelas luminous intensity directly ahead, i.e. zero degrees, and in a 10-degree angular spread to the side of the plane. Between 10 and 20 degrees off the nose of the plane, 30 candelas luminous intensity are required. Between 20 and 110 degrees, an illumination of only 5 candelas is required.

Military aircraft are also required to have such visible navigation lighting systems for operation in civilian areas in a non-covert, visible mode. Accordingly, even military aircraft are equipped with a number of navigational lights, which have traditionally been a plurality of incandescent bulbs. For each bulb, the aircraft has an electric bulb socket, usually the type of socket that is referred to as a bayonet socket, which is wired into the aircraft's electrical system.

The socket is configured to receive and secure a bulb therein and make an electrical contact with it. Power from the electronic system of the aircraft is then supplied through the socket. The incandescent bulb navigation lights of the prior art are conventionally powered by electricity from the internal electronics of the aircraft, which in most U.S. fighter aircraft is 400 Hz AC at 115 volts with a single double wire running to each light bulb.

Normally, the pilot has a brightness control dial or similar control device in the cockpit that allows him to adjust the brightness of the external navigational lights up or down. Adjusting this control dial in prior art systems changes the voltage of the 400 Hz AC current sent to the bulb over the plane's internal electrical wiring.

Figure 2:
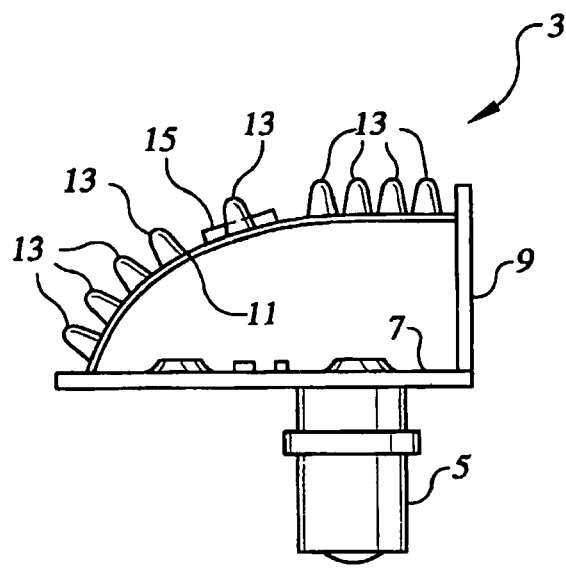
FIG. 2 shows a side view of the dual mode light source unit of the present invention.

As best seen in FIG. 2, the dual mode light source unit 3 for a military aircraft comprises a connection portion 5 which is preferably a standard single-contact bayonet base, which is configured to fit in and connect with a standard bayonet socket for an incandescent bulb in the aircraft. When secured in the bayonet socket, connection portion 5 makes the necessary contacts and receives the control current from the aircraft electrical system in the same way as the incandescent bulbs of the prior art.

The electrical current received is transmitted to electronic circuitry in the form of circuit board 7 mounted fixedly on connection portion 5 and double-sided copper circuit board 9 fixedly attached to circuit board 7 and extending upwardly therefrom. Connected with both boards 7 and 9 is light source mounting board 11, made of thin flex circuit board and supporting the light emitting components of the unit.

Figure 3:
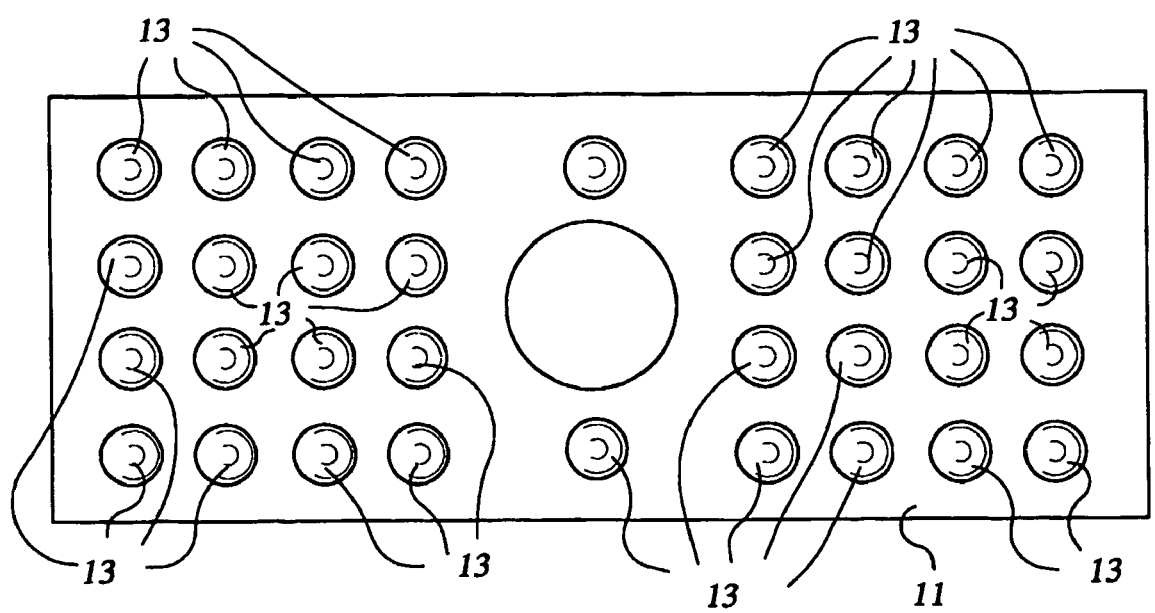
FIG. 3 shows a front view of the LED mounting board used in the unit, showing the arrangement of the LEDs and the IR emitter thereon before it is flexed into position in the unit.

As best seen in FIG. 3, the thin flex board 11 has an array of components secured thereto. The board 11 supports a visible light source in the form of thirty-four (34) visible light-emitting diodes 13 or LEDs (3500 MCD) mounted thereon, in two 4×4 arrays and one on either side of IR light source 15. These LEDs 13 are wired in parallel and connected to board 7 to receive power therefrom, as is IR source 15. A different number of LEDs may be used as required, and also, alternatively, other array configurations may be used to achieve the required luminous intensity distribution as well, especially if LEDs specified in the preferred embodiment are used.

The near-infrared emitter 15 is preferably an emitter such as the super high-power GaAlAs IR emitter sold as model no. OD-50W by the Opto Diode Corp., of Newbury Park, Calif. The preferred IR emitter generates IR at a range of wavelengths centered at about 880 nm, and with a fairly wide angular spread, necessitating only a single emitter for each unit. However, more than one IR emitter may be used, optionally supported in several orientations relative to each other. Night vision goggles used in covert operations are particularly sensitive to the deep red and near-infrared region of the spectrum, and friendly military equipped with night vision goggles are readily able to see the IR produced by the IR emitter 15. Without appropriate night vision equipment, however, the IR light is impossible to see.

The LEDs are selected and configured to emit light conforming to FAA luminous intensity requirements, angular coverage requirements, and chromaticity requirements for Aviation Red or Aviation Green. All of the LEDs for a given light unit are either red or green, depending on whether the unit is to be installed on the left-hand (red) or the right-hand (green) side of the aircraft. The LEDs are high intensity directional LEDs, such as those manufactured by Purdy Electronics of Sunnyvale, Calif., with Model number AND180HSP, Motorola, Inc., with Model number HSMC-S690, or Nichia Corporation of Japan as model number NSPG-510S, or equivalent products. LEDs of this type generally project fairly intense light only within a cone of about 10 to 15 degrees. To meet the FAA requirement for an angular spread of luminous intensity levels as shown in FIG. 1, the board is bowed, as seen in FIG. 2, so that the LEDs point in a plurality of angled directions and achieve the luminous intensity distribution required.

The LEDs generate visible light, but unlike incandescent lights, which are copious emitters of near-infrared energy at any brightness setting, the LEDs are selected for having spectral emission characteristics such that they do not generate much, if any, infrared light. As a consequence, these LEDs will not overpower or unduly degrade an intensified image of the LED when viewed at close range using night vision goggles.

The dual mode light source is configured to be installed by simply substituting the dual mode light source unit for an existing navigation light bulb. The shape, volume, power requirements, and external physical configuration of the dual mode unit of the disclosed embodiment are substantially the same as for the Grimes type 72914/11631, a 6.2-volt, 40-watt incandescent bulb. It will be understood however that virtually any type of light source might be replaced by a suitably configured dual mode light source unit according to the invention.

The electronics of the dual mode unit are preferably set up to interface with the electronic current supplied by the aircraft electrical system so that no further modification is necessary, and covert mode or visible mode may be selected by the pilot by the dimmer control already present for the navigational lights.

In most current navigation light systems which provide for adjusting the brightness of the navigation lights, the control of the brightness is effectuated by varying the voltage of the AC power current sent to the light between a minimum value of about five volts and a maximum value of about 115 volts. According to an aspect of the present invention, this varying voltage control is used to give a pilot control over whether the aircraft is operating in visible civilian mode, or covert IR mode.

Figure 4:
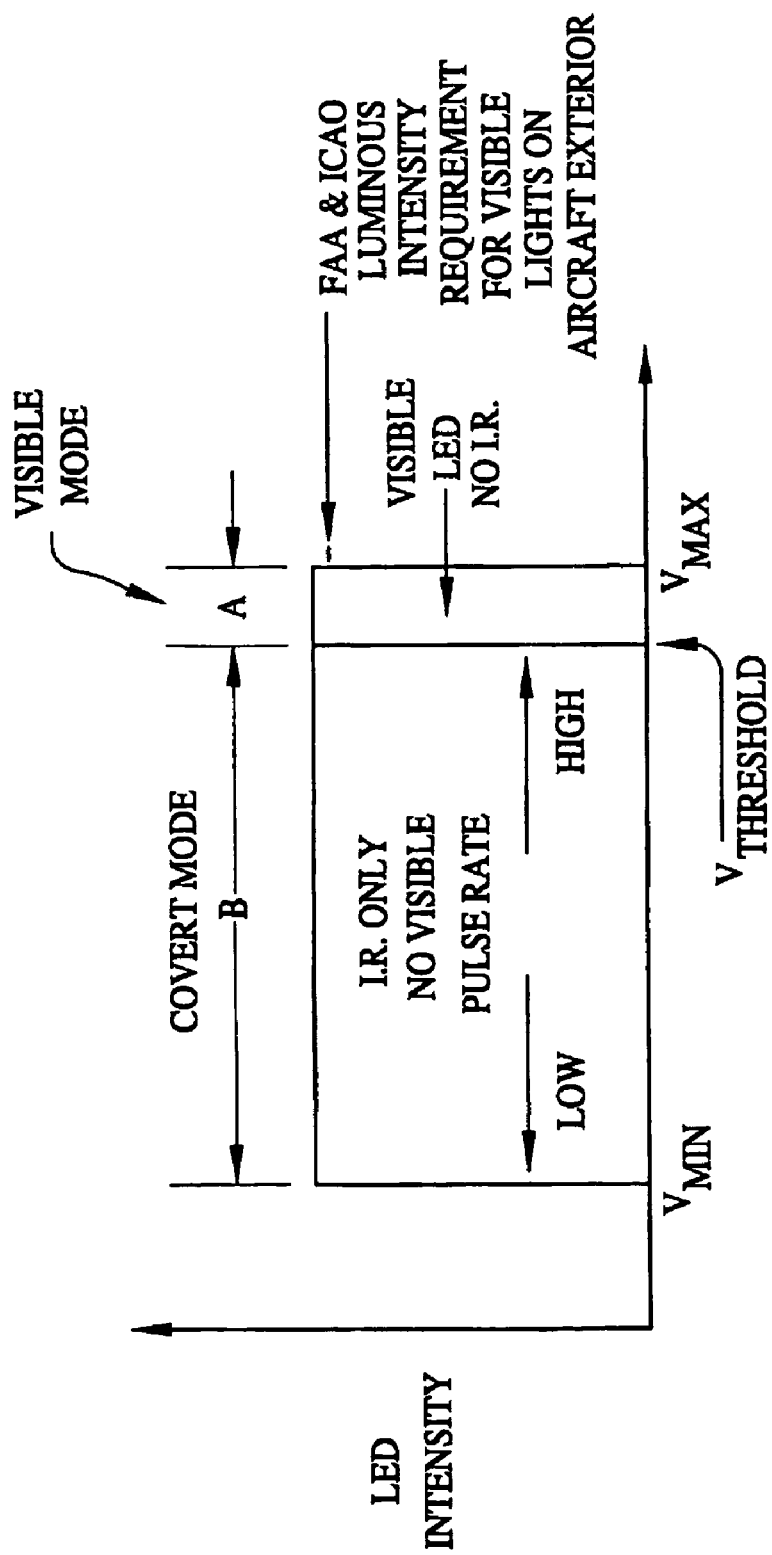
FIG. 4 is a graphical illustration of the operation of a typical installation of the dual mode unit of the invention.

FIG. 4 illustrates the functionality of the electronic circuitry 7 of the unit 3. The circuitry analyses the incoming current from the aircraft, and if the voltage exceeds a preselected threshold voltage $V_{threshold}$, the dual mode unit is placed in visible mode, and only the visible LEDs are illuminated. No power is sent to the IR light source. The intensity of the visible LEDs remains constant irrespective of any changes to different voltages in this range of voltages A.

To enter covert mode, the pilot needs only to turn the existing navigation light brightness control down low enough, thereby reducing the input voltage to the unit. When the unit's electronics detect that the input voltage has dropped below the threshold voltage, the dual mode unit shifts to covert mode; all power is cut to the visible light source (the LEDs 13), and power is sent to illuminate the IR light source.

The IR light source is fed a constant level of power over the entire range B of voltages from $V_{min}$ to the threshold voltage. However, it is desirable, where a number of aircraft are flying covert mode and viewing each other's IR emissions through their night vision goggles, that the IR have a distinctive appearance for some or all of the aircraft. This can be accomplished in the present system by causing the IR light source to pulse on and off periodically so that individual aircraft will have a recognizable cycle or "blink rate" to the pulse of their IR. Adjustment of the voltage by the pilot in this voltage range B results in adjustment of the periodic frequency of the pulsing of the IR emission on the aircraft. Higher voltages result in faster pulsing, and reducing the input voltage slows down the IR pulsing rate. The pulse is preferably a square wave, and in the preferred embodiment the square wave keeps the IR source on about 75% of the time.

Figure 5:
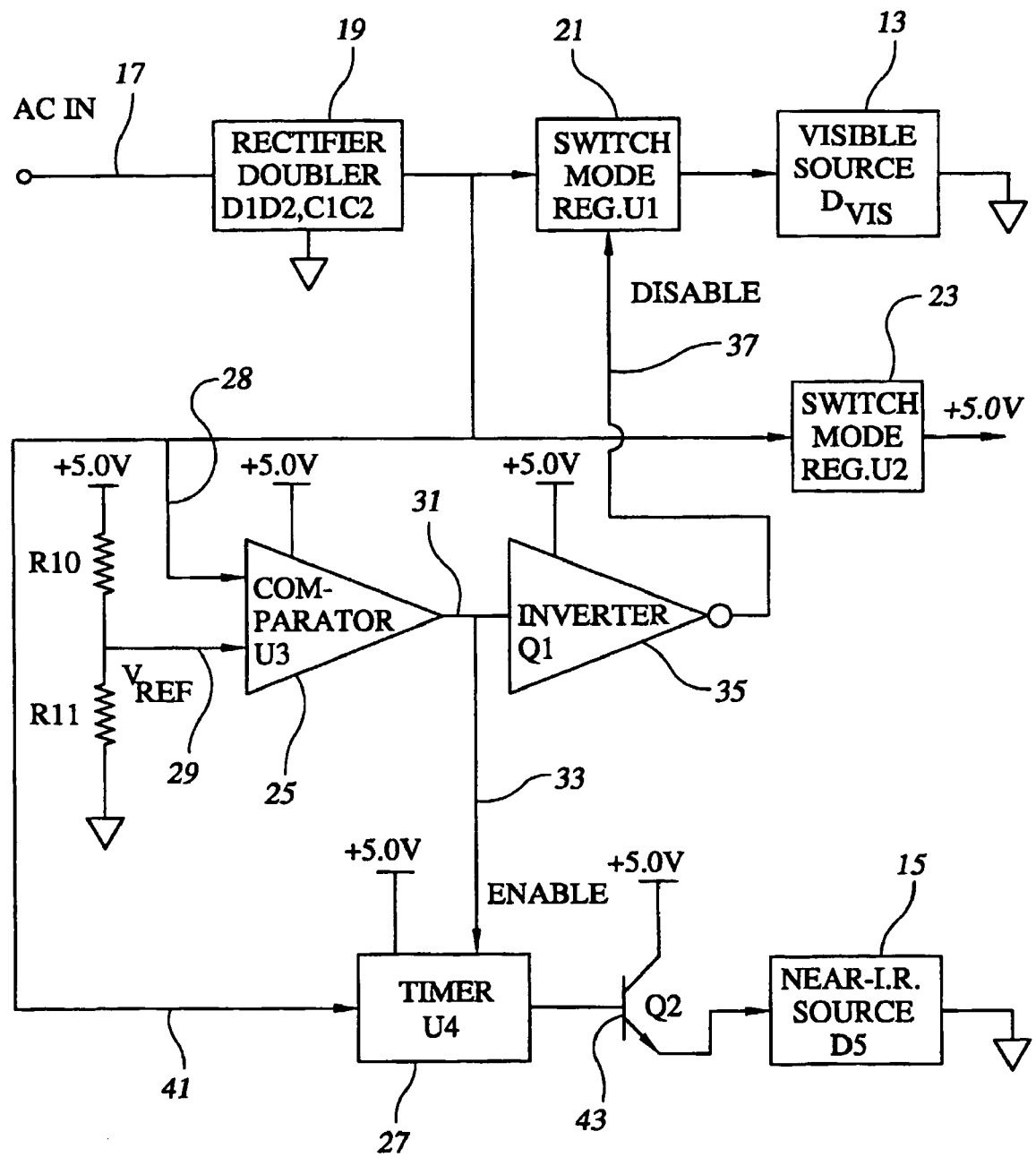
FIG. 5 is a functional diagram of the electronic circuitry of the dual mode light source unit.

The operation of the electronic circuitry of the dual mode unit is illustrated best in FIG. 5. The schematic of FIG. 6 parallels FIG. 5, but shows the individual components in greater detail. Equivalent parts are indicated by the same reference number in the figures.

The input AC power current is introduced from the socket connector base through line 17, which feeds the current into rectifier doubler 19, which converts the AC to equivalent voltage DC current. This DC current is delivered to the visual light source (LEDs 13) through visual mode switch 21, to switch mode voltage regulator 23, which converts the variable voltage current to a steady DC output, and also to voltage comparator 25, which determines the mode of the unit, and to IR light source 15 through switchable control mode timer circuitry 27.

The determination of which mode the unit is to be in is made at comparator 25, which receives the input voltage along line 28 and compares this input voltage to a preset reference voltage from line 29 from a divider network which corresponds to the threshold voltage for the change between covert and visible modes. This reference voltage in the preferred embodiment is about 5.8 volts, although this threshold value could vary considerably. If the input current is in an electrical state indicating visible mode (e.g., voltage higher than threshold), the comparator output 31 snaps to low. This low voltage is sent by line 33 to switchable timer 27 for the IR light source, and switches it off so no power goes to the IR light source. The low output on line 31 is also inverted by inverter 35, and this high output is sent via line 37 to turn on the switching regulator 21, allowing the constant DC current to flow through to the visible light source LEDs 13. The LEDs thus remain at a constant intensity despite any variations in input voltage at this level.

If the input current is in an electrical state that indicates covert mode (e.g., voltage below threshold, range B in FIG. 4), then the comparator 25 produces an output that snaps to high. This high output is inverted by inverter 35 to produce a low signal to the switch mode regulator 21, cutting the flow of power to the visual light source. At the same time, the high output on line 31 switches timer 27 on.

When switched on, timer 27 acts as a voltage controlled oscillator, and the high output 33 applied thereto runs it in an astable mode, oscillating at a frequency based on the voltage applied thereto along line 41, with higher frequency oscillation produced by higher input voltage. This rate of oscillation is in a range that can be seen by the human eye, and provides the adjustable blink rate for the IR light source based on the pilot-controlled level of input voltage.

The output of the oscillation of the timer goes to a follower 43 and causes it to switch a 5 volt power supply to the IR light source on and off responsive thereto. The resulting pulsing current flows to IR source 15 and causes it to pulse periodically. Since the rate of pulsing IR is dependent on the input voltage, it can be adjusted by also adjusting the input current voltage by adjusting the cockpit brightness control in the lower range that corresponds to covert mode.

An existing aircraft with variable brightness control for its navigational lights can be upgraded to an infrared covert capability by substituting a dual mode light source unit for each of the incandescent navigation light bulbs thereof. When this is done, existing brightness controls may be used to operate in visual or covert mode as follows.

In normal civilian airspace, the pilot illuminates the navigation lights by setting the brightness control at a high setting corresponding to a voltage above the threshold at the sockets. When covert operation is desired, the pilot dials down the brightness control until the visible navigation lights go out. If the pilot puts on night vision goggles, he will see the IR emitters blinking at a certain rate. He can adjust this rate to be slower by further dialing down the brightness control. The settings for specific recognizable pulsing rates may be incorporated into the control as desired to aid in coordination of the speed of pulsing between aircraft.

New aircraft may also be equipped with dual mode light sources according to the invention with substantial benefits as well. The dual mode unit has an enhanced lifetime over that of incandescent bulbs, and also obtains an advantage over separate visible/IR systems by use of only a single wire pair for control of both types of light, reducing labor and cost of manufacture, and to a degree, weight of the aircraft.

Figure 8:
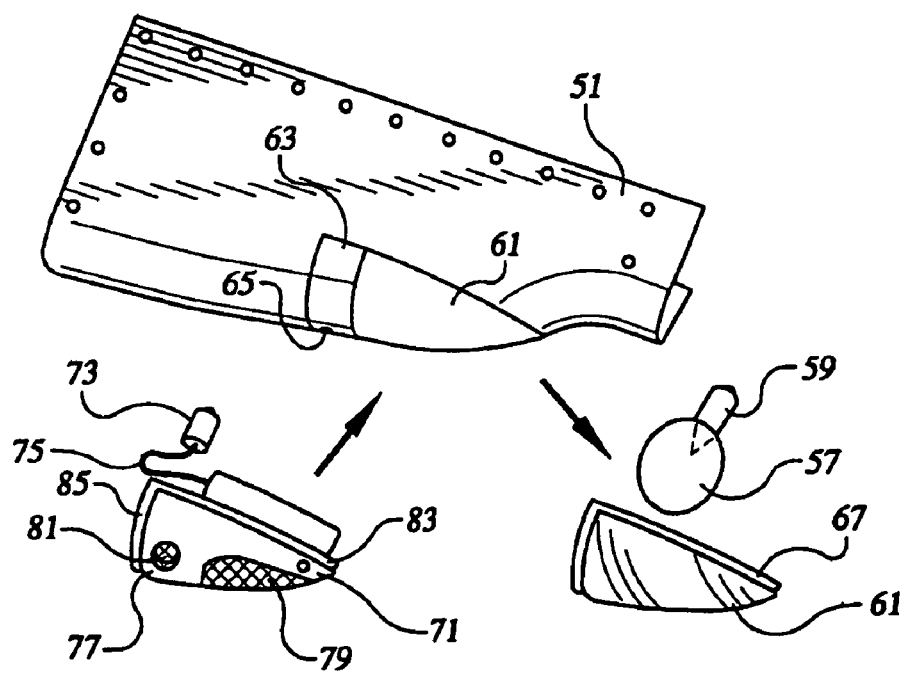
FIG. 8 is a schematic illustration of an upgrade to an aircraft lighting system with another embodiment of light source module according to the present invention.
Figure 9:
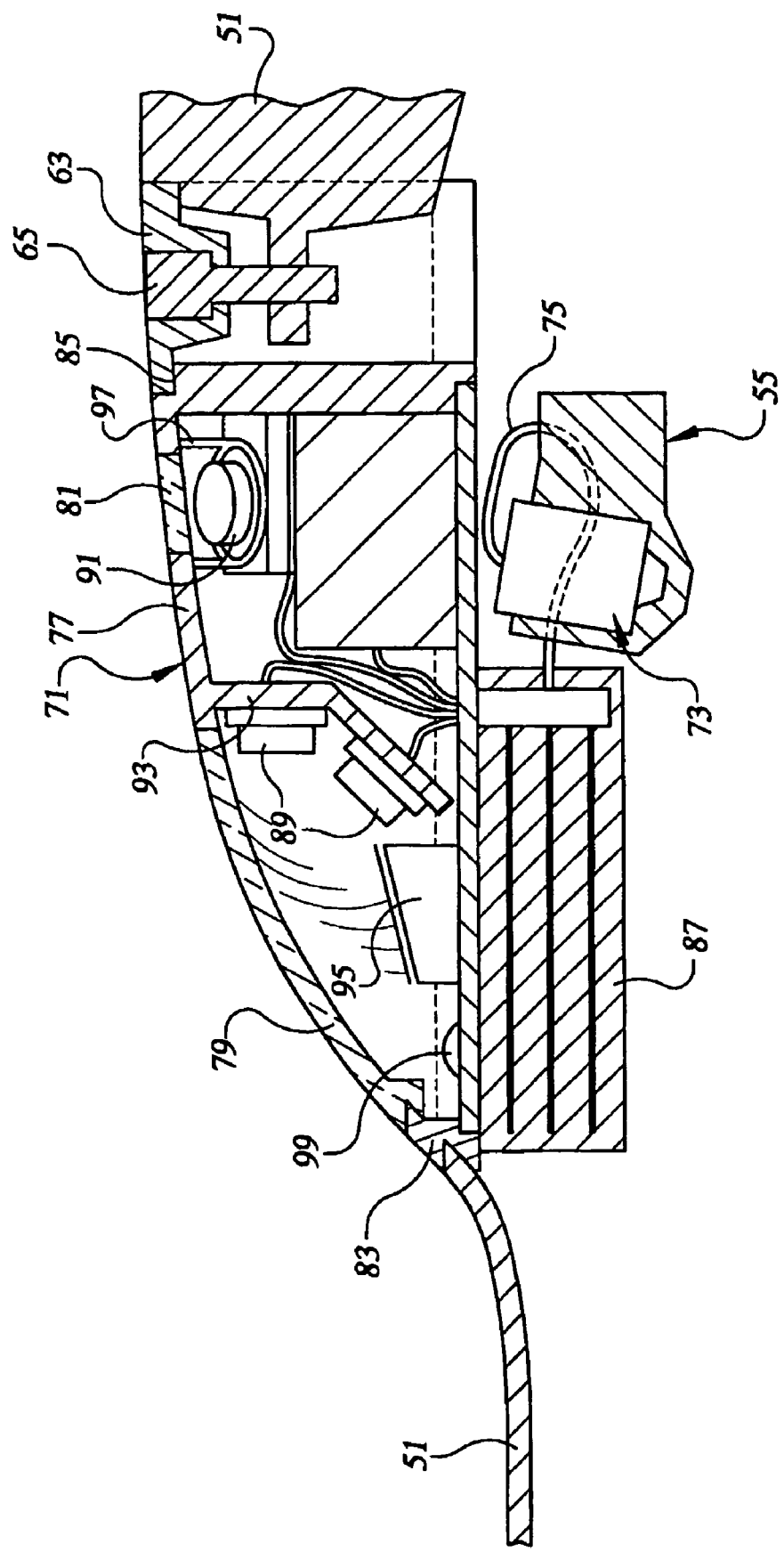
FIG. 9 is a horizontal cross-sectional view of a wingtip having an upgraded aircraft lighting system with embodiment of light source module shown in FIG. 8.

Another embodiment of the invention is shown in FIGS. 8 and 9, as well as a method of upgrading an aircraft with an incandescent light fixture.

Figure 7:
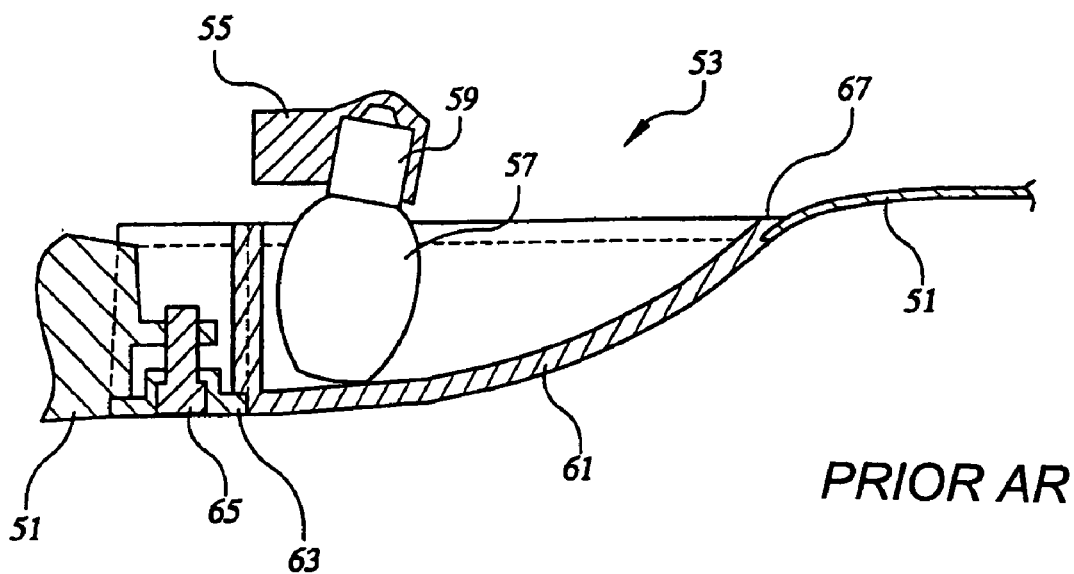
FIG. 7 is a horizontal cross-sectional view through an aircraft wingtip, showing a conventional incandescent bulb fixture and glass lens of the prior art.

An existing incandescent light fixture is an aircraft as shown in FIG. 7. The aircraft has a body 51, which for illustrative purposes in FIGS. 7 and 8 is a wingtip, with a space 53 therein in which a socket 55 is supported. Socket 55 is part of the electrical system of the aircraft, and is supplied with AC power, usually by a single pair of wires, not shown, as discussed previously herein. Incandescent bulb 57 is removably secured in socket 55 by a bayonet portion 59 thereof.

The body 51 of the aircraft has an aperture therein through which the bulb 57 in space 53 can be accessed. This aperture is closed during normal operation of the aircraft by a lens 61 that is held in aperture by security plate 63 that is secured by Allen bolt 65, and also by a lip structure generally indicated at 67 on the lens 61 that fits in engagement with the aircraft body 51 at the edge of the aperture.

Referring to FIG. 8, an existing incandescent bulb light can be retrofit or upgraded to an LED-based lamp by installation of a self-contained light assembly or unit 71 in the aperture of the aircraft body 51. Installation involves removal of the Allen bolt 65 and retaining plate 63. The lens 61 and bulb 57 are then removed from the socket 55.

Electrical connection portion, or bayonet fitting, 73 of the unit 71 is inserted into socket 55 so as to receive electrical power therefrom and transmit the power through a flexible electrical umbilical cable 75 that links bayonet fitting 73 to lighting circuitry housed in unit 71. By use of the bayonet connection 73, power for the unit 71 can be drawn from the existing electrical system without modification.

The unit 71 includes a housing 75 that holds control circuitry connected with a metallic outer housing 77. The outer housing 77 supports a window or light portion 79 through which visible light can pass. The outer housing 77 also supports, for military applications, a second window or IR light transmitting portion 81 of material through which infra-red light can pass for covert mode operations.

The outer portion 77 of the unit 71 exactly duplicates the shape of the pre-existing lens 61, and is configured to fit in the aperture in the aircraft body 51 in place of and mount identically to lens 61. In the method of FIG. 8, the bayonet fitting is secured and electrically connected in the socket 55, and the umbilical cable is coiled and fit into the space 53. The unit 71 is then placed in the aperture and a lip structure 83 of the unit 71 interlockingly engages the edge of the aperture, as the lens 61 was held. Plate 63 is then secured with Allen bolt 65 over unit 71, fitting into a recess 85 at a rear edge of the assembly housing 77.

The outer portion 77 and windows 79 and 81 together define an outer surface that is also identical to the outer surface of the lens 61. The unit 71 thus becomes the lens 61 duplicated in metal, with appropriate windows or ports flush with and maintaining the preexistent profile of the outer surface. By virtue of its exposed profile and shape matching that of the original lens, the unit 71 thus does not affect, compromise or degrade the aerodynamic characteristics of an aircraft in which the lens forms an integral or important part of the airfoil shape and/or design.

Referring to FIG. 9, the light module 71 also includes a housing 87 that extends inwardly of the aircraft body into space 53. Housing 87 supports inside it light control circuitry, which is preferably voltage discrimination and control circuitry similar to the circuitry shown in FIGS. 5 and 6, and discussed above. The circuitry is connected with umbilical cable 75 and receives electrical power therefrom. The circuitry in housing 87 is connected by wiring to power supply and/or power conditioning circuitry 88 and to a plurality of visible-light LEDs 89 and an infra-red emitter 91. Depending on an electrical condition or parameter, e.g., voltage, of the electrical current received from socket 55 and the electrical system of the aircraft, the light control circuitry sends power to and illuminates the visible light LEDs 89 or the IR emitter 91, as with the first embodiment discussed above.

The visible LEDs 89 are preferably high intensity LEDs, and especially preferred are LEDs sold by Lumileds Lighting LLC of San Jose, Calif. under the name Luxeon™ Star. Preferably three of these LEDs are used, supported at appropriate angles on mounting portion 93 so that the visible light emitted from the LEDs is transmitted through window 79 in said housing 77 and is angularly distributed according to specific patterns, e.g., FAA requirements. To aid in proper distribution of the light from the LEDs, a mirror 95 is also provided inside the outer housing 77.

In addition to replacing the lens, the unit 71 also replaces the internal incandescent lamp in aircraft red (left), green (right), or white (tail) external navigation light fixtures, and therefore must emit light of the correct color. The LEDs used in the unit in these different positions are preferably color LEDs that emit a light of the appropriate color for the location of the fixture in the aircraft, i.e., red, green or white. Since these LEDs have the correct color light output, the window 79 may be of clear material, and not a color filter.

The LEDs 89 are mounted on mounting portion 93 so as to readily transmit heat created to the mounting portion 93. This heat must be carried away (heat-sinked), or light emission from the LEDs will decrease. Both the mounting portion 93 and the outer housing 77 are of thermally conductive metal, preferably aluminum, and, to remove the heat, mounting portion 93 is connected thermally and mechanically to the metallic outer housing 77, which has an adequate surface area to dissipate the heat produced by the LEDs. The mounting portion 93 and outer housing 77 are preferably a continuous aluminum structure or connected by a metal-to-metal contact to form a thermal link with a suitable cross sectional area to the direction of heat flow, such that heat in mounting portion 93 flows to the outer housing 77 and is dissipated to the external airflow passing over the aircraft body, and the temperatures of the LEDs remain within an acceptable operating range.

By virtue of the unit 71 substituting for a fixture of lens, the external surface of the metal housing 77 is directly exposed to moving airflow, and the unit 71 thus is particularly efficient in radiating waste heat internally generated by the circuitry and LEDs contained within it. The metal housing 77 also functions as a mounting chassis for the light control circuitry and the infra-red emitter, which are also physically integrated into, heat-sinked, and protected by said housing 77. By such means of heat radiation, which is far more efficient than in a structure in which an array of high intensity LEDs is located beneath or behind an existing lens but not directly thermally bonded to a metal surface exposed to outside airflow, the unit 71 permits higher intensity light emission from LEDs than otherwise is possible with existing "plug and play" LED substitutes for incandescent lamps. Also, the LEDs used are smaller physically than the incandescent lamp and can be mounted closer to the outer glass lens and connected with the metal part of the fixture nearer the outside of the aircraft, reducing the distance heat must flow to be released outside the aircraft.

As stated above, the illustrative unit 71 of FIGS. 8 and 9 is configured for placement in a military aircraft for which infra-red emission is desired for covert operations. Consequently, the unit 71 includes IR emitter 91 that selectively into IR light through window 81. The IR emitter 91 is preferably surrounded by a shroud 97 that directs all IR emissions in angular directions that can only be seen with NVGs from desired aspects, usually upward, above the horizontal horizon of the aircraft.

Figure 6:
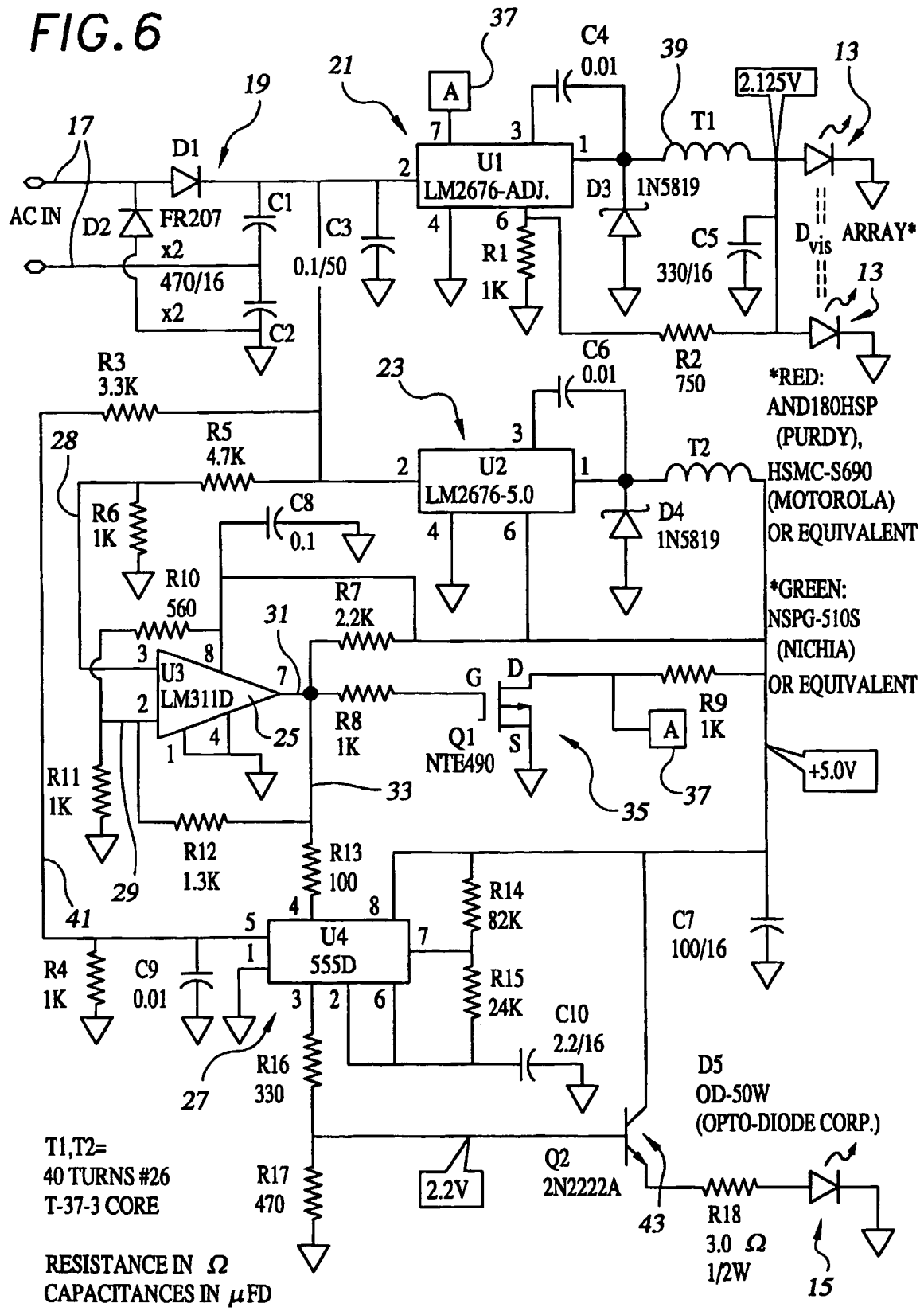
FIG. 6 is a more detailed schematic of the circuitry of the dual mode light source unit.

The light control circuitry for a military aircraft light assembly or unit is preferably dual-mode circuitry, similar to or such as shown in FIGS. 5 and 6. This circuitry receives power from the aircraft electrical system, preferably through the fixture socket. The electric circuitry is configured to process the input current from the socket and based thereon operate in either civilian, visible mode or covert IR mode. Where the current is in one electrical state, such as for example at a voltage above a preset threshold, the electric circuit sends power derived from the incoming current and illuminates the LEDs. When the current is in a different electrical state, e.g., at a voltage below the preset threshold voltage level, the circuitry cuts power to the LEDs and sends power only to the IR emitter, and no visible light is emitted.

The detected electrical states that are most compatible for interface with existing aircraft controls without modification are different voltages. Depending on the cockpit electronics, the existing aircraft electrical system may supply electrical current at any of several voltage levels set by the lighting intensity control in the cockpit. Most military aircraft have navigational light dimmer controls in the cockpit with at least two brightness settings, to as many as five settings. For example, F-15's usually have a cockpit control switch with five different illuminations intensity levels producing voltages of, e.g., 30, 50, 70, 90 and 115 volts, while F-16's have only two switch positions, producing 55 or 110 volts. In either aircraft, however, the light control circuitry, in the embodiment of FIGS. 5 and 6, detects the different voltage levels using a comparator 25 (FIG. 5), and causes the IR emitter to pulse at different frequencies set by a timer 27 based on different input voltage levels. The different pulsing makes the aircraft easier to recognize and distinguish from other aircraft by other pilots using NVGs.

To make the assembly more adaptable to different aircraft electronics, the light circuitry of the preferred embodiment is modified from the circuit of FIGS. 5 and 6 in two ways.

First, instead of the comparator 27, the light control circuitry in the unit 71 preferably includes a microcontroller which senses the voltage of the input current supplied from the existing external lighting control located in the cockpit.

The microcontroller is pre-programmable (or re-programmable) by a user to respond to different AC or DC voltage inputs from the existing aircraft lighting electrical system and to drive based on the programmed voltage level, driving the visible light emitting diodes (LEDs) or infrared emitting diodes (IREDs) to emit steady (constant) output or flashing output of different rates, patterns, duty cycles, etc as desired. Because the voltage value corresponding to each given external lighting intensity setting may differ slightly from aircraft to aircraft due to tolerances or aging of aircraft electrical system components, the microcontroller also allows the unit to be tailored to individual aircraft and give the same desired light output (or infrared output) response for a given intensity setting even when installed in different aircraft having different electrical characteristics.

Figures 15, 16:
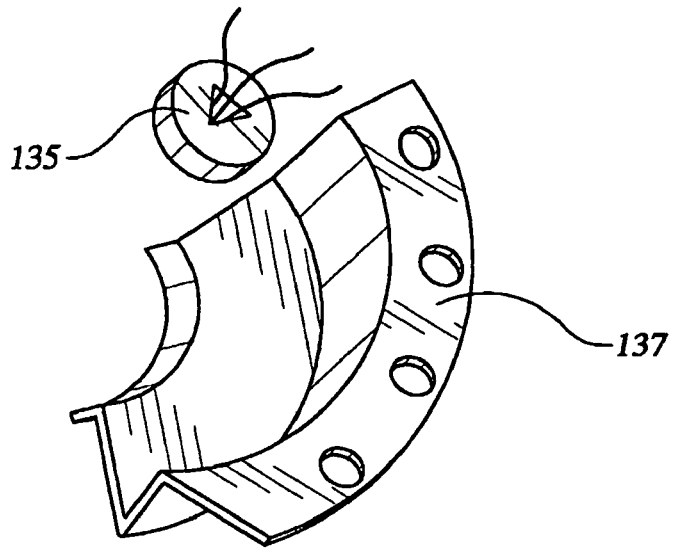
FIG. 15 is a perspective illustration of the relative position of the infra red emitter and a reflector plate in the aircraft light unit of FIGS. 10 to 14.
FIG. 16 is a chart showing the relative visible and covert emissions from a device according to the invention for the settings of the five-position navigational light intensity switch in an F-15 cockpit control panel.

Second, instead of the timer that adjusts frequency of the flashing IR emitter on the aircraft, the light control circuit is provided with a pre-programmable feature through which different flash patterns can be entered and assigned to different voltage levels of current from the aircraft. These flash patterns are used to turn the IR emitter on and off in time-dependent repeating patterns, which aid in visual identification of the aircraft with NVGs at a distance. An example of different flash patterns that might be used in an aircraft such as an F-15 with a five-position intensity control are shown in the chart of FIG. 16. The flash patterns may be quite varied, but generally are arrangements of short pulses, longer pulses, and intervals of varying duration between pulses.

Both the setting of the voltage levels for different IR or visible emissions and the programming of the IR flash patterns are accomplished by input to the light control circuitry. Preprogramming, or re-programming, of different covert flash characteristics (e.g., simple pulsing at different rates or more complicated patters for flashing, such as a short flash followed by a long flash, or irregularly spaced flashes) may be accomplished on the ground by a user by means of a hand-held programming device that interfaces with programmable circuitry in the unit. The hand-held programming device can input commands, data and selections of the flash patterns or the electrical states or characteristics, such as voltage levels, on which the circuitry makes a determination of which mode the unit should operate in. The input from the hand-held programming device may be accomplished even after installation directly through the window and through an infra-red data port 99, best shown in FIG. 9, or by a jack or a pin connection on the housing 87 that can be accessed before the unit 71 is installed, by a mechanical plug-in connector from a hand-held device. The circuit can be reprogrammed if necessary to set specific voltage levels or ranges to be detected, and to set the specific visible or covert emissions and patterns associated with each of the defined voltage levels or ranges.

It will be understood by those of skill in the art that different characteristics of the current, e.g., amperage or digital data in the current, may also be used to detect from the input current at the socket the desired covert or visible action, and that the light control circuitry may be programmed to modify those parameters and actions as desired.

For civilian or commercial aircraft, the light unit 71 is built to emit light energy only in the visible part of the electromagnetic spectrum, and the unit is a self-contained assembly that contains high intensity LEDs that emit visible light, and associated voltage conditioning circuitry. No separate IR emitter 91 or IR window 81 is supplied in the civilian version of the unit, but the general form of the housing copying the external shape of the original lens and being conformal to the shape of the contour of the aircraft is similar to the military light unit.

Since there is no need to selectively control infra-red covert lighting in a civilian aircraft, the light control circuitry functions mainly to condition the electricity received from the aircraft electronics to be used to directly power the LEDs. Even though configured to emit visible light only, however, a commercial aircraft assembly nonetheless benefits from the heat transfer to direct exposure of the metal housing to external airflow to facilitate the liberation or radiation of heat from the high-intensity visible-light LEDs contained within the housing, thus permitting greater luminous intensity output from said LEDs cluster than otherwise would be possible. The LEDs in a civilian version are therefore also thermally bonded to a mounting portion 93 that is connected thermally and mechanically to the outer portion 77 of the unit 71.

Figure 10:
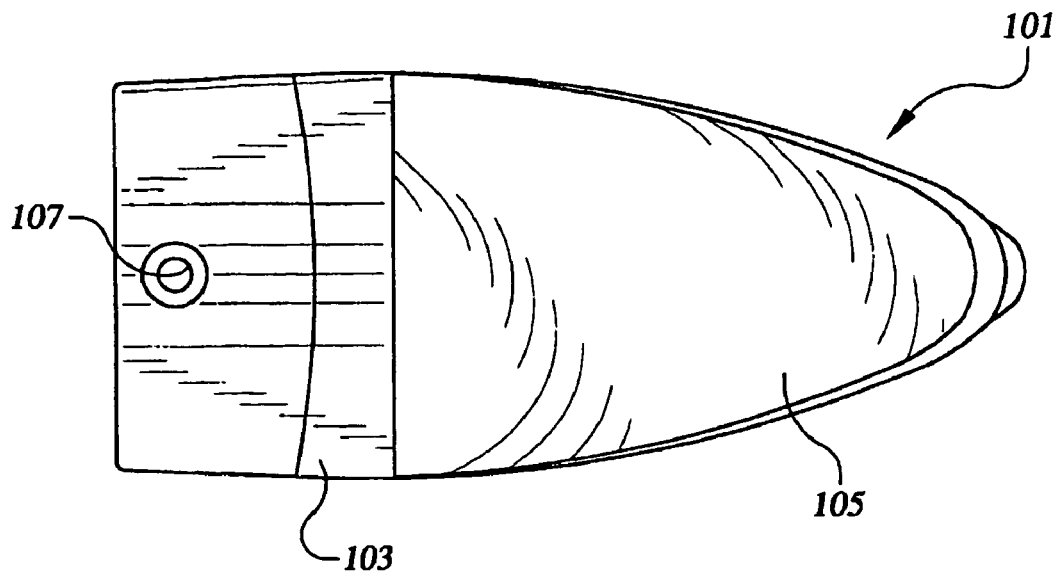
FIG. 10 is a plan view of a preferred embodiment of a modular aircraft light unit.

The most preferred embodiment of the light source unit of the invention is shown in FIG. 10. The light source module 101 of this embodiment is configured to have an external shape identical to that of level 61 and securement plate 63 combined. As best seen in FIG. 10, the light source unit 101 has a metallic outer portion 103 that serves as a frame that supports therein a window or light transmissive member 105. Outer portion 103 has a bore 107 therein configured to receive Allen bolt 65 therethrough securing the unit 101 in the aperture on the aircraft. Unit 103 also has a lip structure 109 that engages the edge of the aperture to hold the unit 101 on the aircraft body 51.

Figure 11:
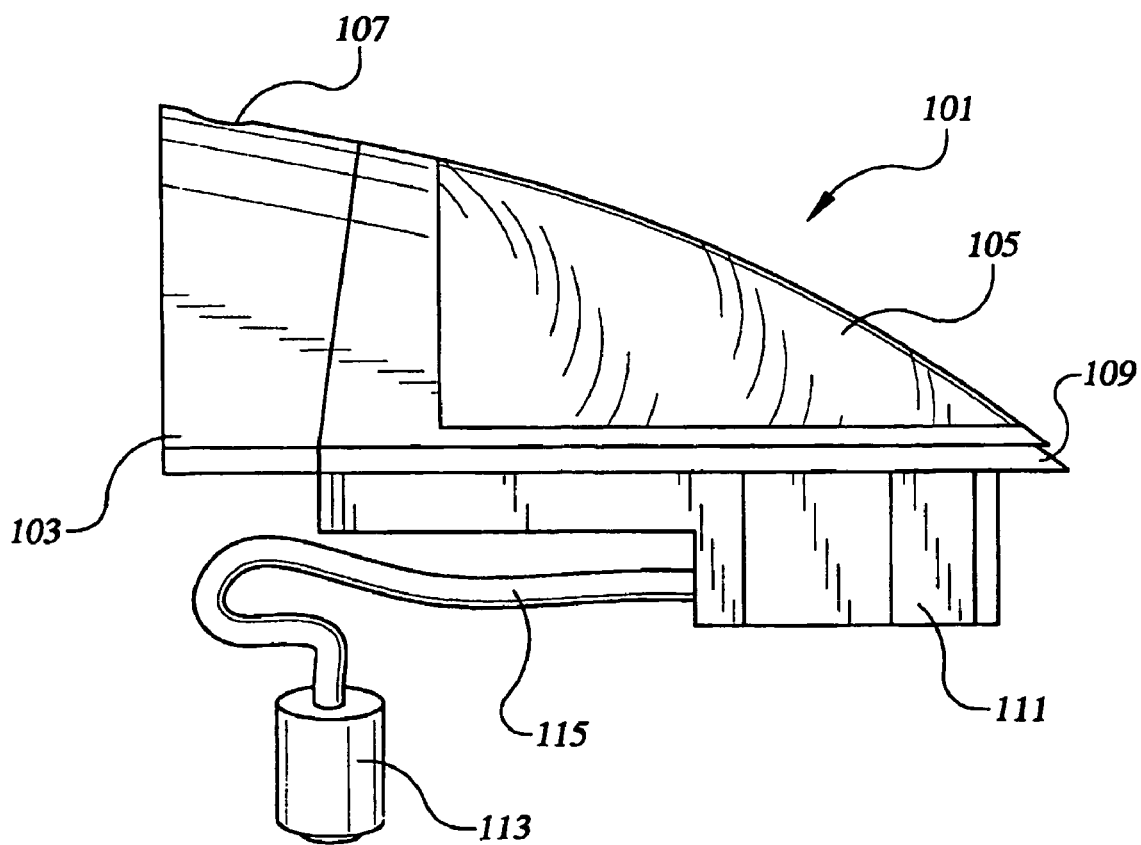
FIG. 11 is a side view of the aircraft light unit of FIG. 10.
Figure 12:
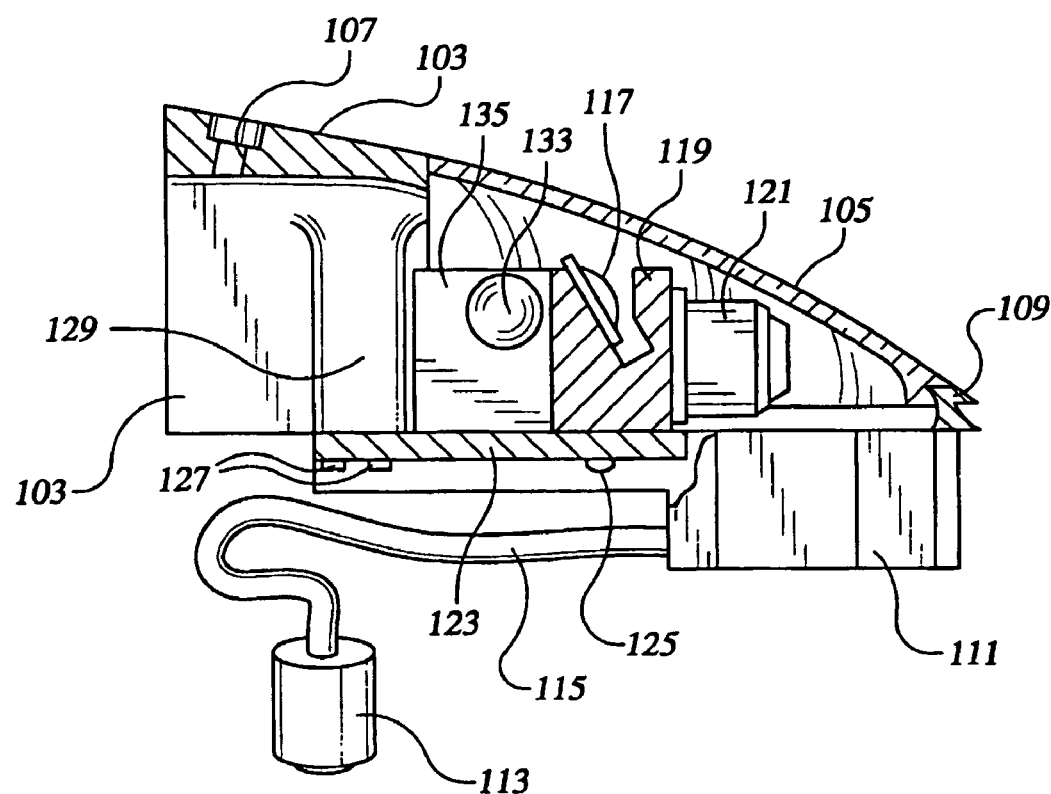
FIG. 12 is a partially cut-away view as in FIG. 11 showing the interior of the aircraft light unit.

As best seen in FIGS. 11 and 12, below the outer portion 103, the unit 101 has an inward housing or electronics envelope 111 that contains light control circuitry as described for any of the preceding embodiments, connected by a flexible electrical umbilical cable 115 with a bayonet fitting 113, which connects with the socket 55 connecting to wiring in the aircraft that connects with pilot interface circuitry (e.g., cockpit controls) and receives electrical current therefrom, as discussed with respect to the earlier embodiments. The light control circuitry is similar to the light control circuitry of the preceding embodiments, especially the programmable form above with the relevant input port or pins, and it receives the electrical current from the aircraft and selectively transmits power derived therefrom to connecting wiring (not shown) leading to visible-light LED sources or a near infra-red emitter.

The LEDs on the unit 101 preferably are three Luxeon™ Star LEDs of appropriate color and intensity to produce illumination satisfying the FAA or other applicable regulations. These LEDs have an aluminum core that is a built-in heat sink that can be engaged against a suitable surface to transmit heat thereto. Two LEDs 117 are each secured thermally and mechanically on mounting structure 119 on a thermally conductive inclined surface thereof, facing forward and outward of the unit 101 at respective angles to achieve the desired distribution of visible light therefrom. The third LED is housed in a prismatic lens structure 121, but is also mechanically and thermally bonded to a face of mounting structure 119. The positions of LEDs 117 and lens structure 121 distribute the visible light from the LEDs so as to achieve the requisite angular and intensity distribution.

Mounting structure 119 is itself mounted on support plate 123 by fastener on bolt 125. Support plate 123 is supported in a continuous manner by being secured by fasteners or bolts 127 that fixedly attach to the lower end of interior rib 129 of outer housing 103. Mounting structure 119, support plate 123, and outer portion 103 each are of thermally conductive metal, preferably aluminum, and are thermally connected with each other with adequate cross-sectional area to the direction of heat flow such that heat from the LEDs 117 is transferred to mounting structure 119, and then transmitted to support number 123, through interior rib 129 into the metal outer portion 103, which has adequate surface area to dissipate the heat into the external airflow over the aircraft. The IR emitter and the circuitry of the unit 101 are also preferably thermally linked to metal outer portion 103 to dissipate any heat therein as well.

Figure 13:
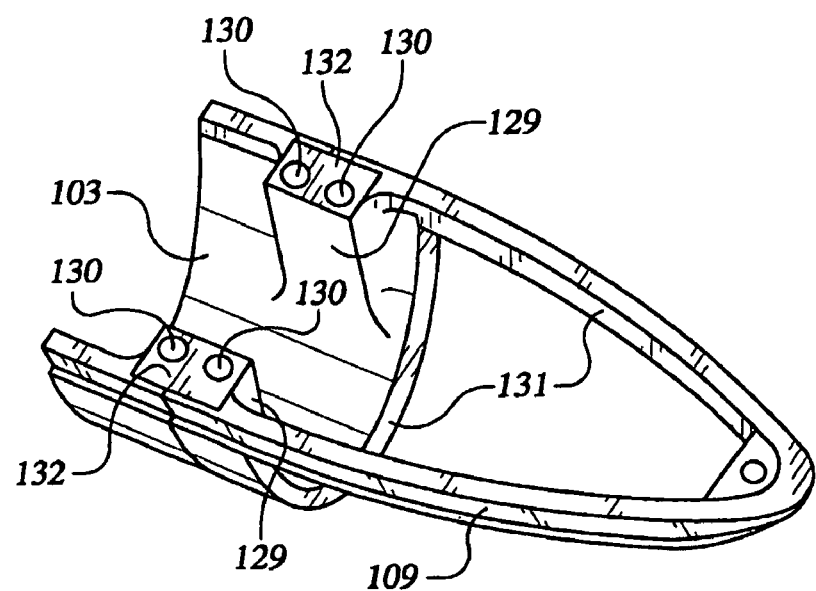
FIG. 13 is a perspective view of the bottom of the metallic outer portion of the modular unit of FIGS. 10 to 12.

The form of the metallic outer portion 103 is best shown in FIG. 13. The outer portion 103 is preferably formed as one piece of aluminum. Ribs 129 are each provided with threaded bores 130 to receive bolts 127 securing the face 132 in engagement with the support plate 123 to provide for a thermal connection and good heat flow between the parts, and at a minimum, adequate heat flow to dissipate enough heat that the LEDs remain in an acceptable range of operating temperatures. The outer portion 103 includes a frame structure 131 that receives therein the material of the window 105, where it is secured by adhesive or otherwise and preferably caulked in place. The window 105 itself is symmetrical and the frame structure 131 has an aperture therein for receiving and securing the window 105 that is symmetrical in terms of the shape of window 105 that it can receive. As a result, the same window 105 can be used with the outer portion 103 on either side of the plane, even though the outer portions 103 from opposite sides of the plane are mirror images of each other.

The unit also includes infrared emitter 133 supported on plate 135, which is preferably a printed circuit board that is linked thermally to sink heat to the outer portion 103. The near-infrared emitter 133 is preferably an emitter such as the super high-power GaAlAs IR emitter sold as model no. OD-50W by the Opto Diode Corp., of Newbury Park, Calif. The preferred IR emitter generates IR at a range of wavelengths centered at about 880 nm, and with a fairly wide angular spread, necessitating only a single emitter for each unit. However, more than one IR emitter may be used, optionally supported in several orientations relative to each other. Plate 135 is preferably also thermally linked to the metal outer surface of the unit 101 to dissipate heat in the IR emitter 137 to the outside airflow.

It is desirable that infra-red radiation be directed only upwardly from the source to be visible with NVGs from other aircraft that are level with or above the aircraft with the light unit installed, and to prevent viewing of the aircraft from below with NVGs. When the unit 101 is installed in an aircraft (see FIG. 14) the IR emitter 133 is actually oriented to face downwardly. To prevent IR emissions from radiating downwardly, a reflector 137 is provided. This reflector has roughly hat-shaped cross section and reflects all IR from the emitter upwardly. The spatial relationship of the reflector 137 and the IR emitter is illustrated schematically in FIG. 15.

Figure 14:
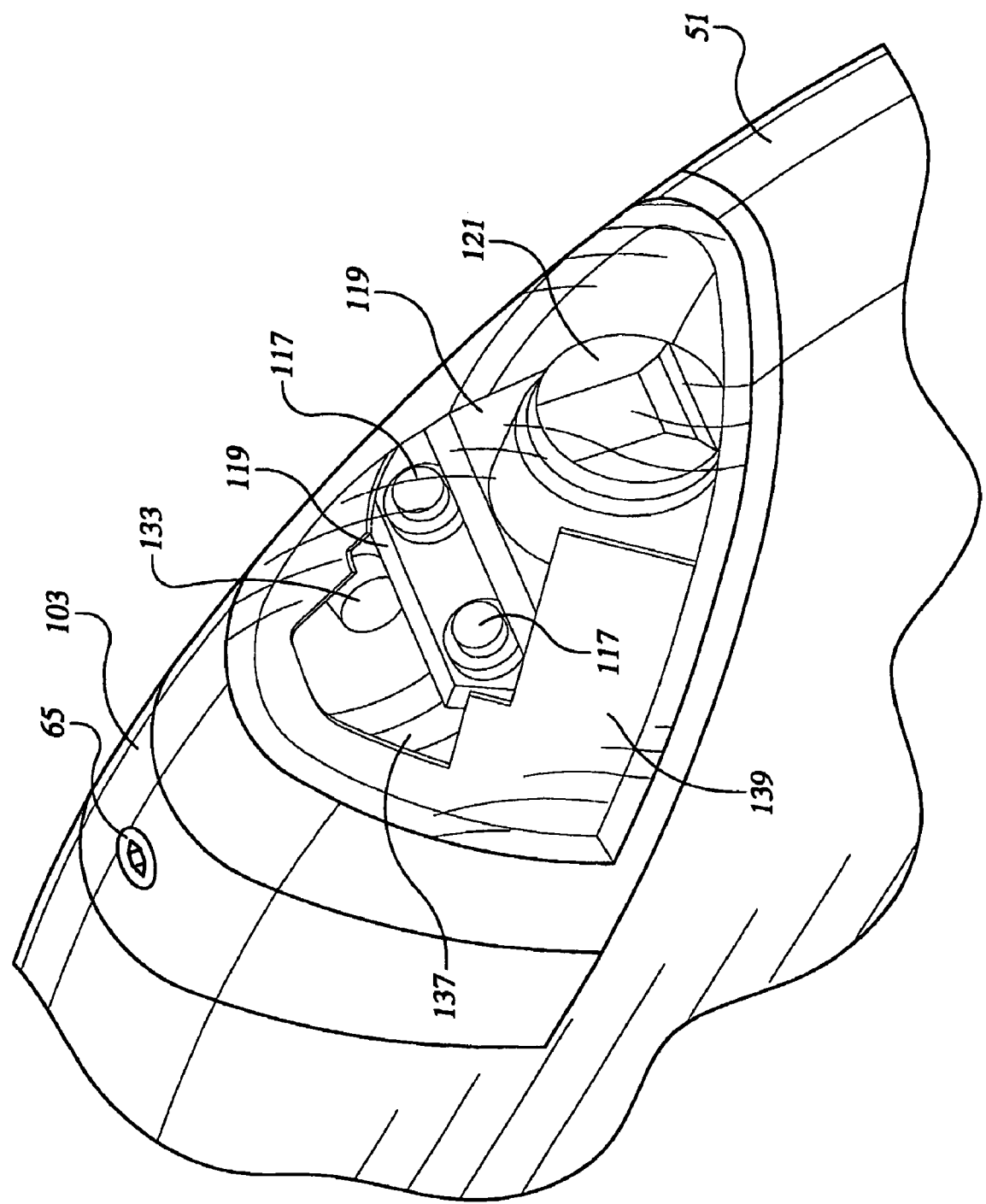
FIG. 14 is a perspective view of an aircraft light unit as shown in FIGS. 10 to 13 installed in an aircraft wingtip.

IR radiation downward is also blocked by IR opaque paint or foil mask 139 on the inside of part of the window 105 where it does not obstruct desired visible light from the LEDs when they are illuminated. The mask 139 shown in FIG. 14 is partially cut-away to show the IR emitter 133, but normally, the IR emitter 133 would not be visible from the angle of the view of FIG. 14. The mask 139 in fact extends upward to whatever height and whatever shape is necessary to block downward radiation of the infra red light.

The window 105 is preferably otherwise of transparent material, especially glass, that transmits therethrough both visible light from the LEDs and infra-red radiation from the emitter 137 without substantial diffusion. In addition, the window is preferably provided with an electromagnetic interference (EMI) shield to reduce or eliminate emission of susceptibility to radio frequency energy, and with a metallic coating or sieve to create a conductive skin on the unit 101 that is less affected by various RF radiation.

Installation of the unit 101 is similar to the method of FIG. 9, and the unit functions as a plug-and-play heat sinked module foe the LEDs and other parts of the unit 101 without the need to structurally tie in with any other structure of the aircraft. The existing lens 61 and securing plate 63 are removed. The bayonet fitting 113 of the unit 101 is placed in the socket 55, and the unit 101 is then secured in the aperture in place of lens 61 and plate 63. The Allen bolt 65 is re-used to secure the unit 101 to the aircraft body 51 through aperture 107. The apparatus is then ready for use.

The civilian or commercial aircraft variation of the unit 101 does not have the IR emitter 133 or retroreflector 137. Accordingly, the window 105 can be reduced in size to cover the portion of the interior of the unit 101 that emits infra-red light in the military version. This increases the metal surface area of metal outer portion 103, which is an added benefit because it improves the dissipation of heat created by the LEDs 117.

As with the previous embodiment, the light control circuitry in a unit 101 for civilian use is greatly simplified because there is no need for the unit to screen the input current for possible indications of various covert IR mode actions. The circuitry rather primarily functions as voltage conditioning circuitry, i.e., to convert the input current to a form of electrical power, e.g., lower voltage DC current, that can be applied to power the LEDs 117.

Whether applied to civilian or military applications, the subject invention provides benefits in terms of direct exposure of the metal housing to external airflow to facilitate the liberation or radiation of heat from one or more high intensity visible light LEDs contained within the housing, thus permitting greater luminous intensity output from the LEDs than otherwise would be possible, and this heat sinking is achieved in a plug-and-play application without need for metal surgery on the aircraft. The commercial and military versions of the light unit afford substantial advantages, including:

i. The cost of the system and method of the invention is comparatively lower than that of previous approaches.

ii. Implementation requires no change to existing voltage or power characteristics in the aircraft, nor modifications to any part of the existing aircraft electrical system.

iii. Implementation is quickly accomplished through simple substitution of the device for existing lenses and lamps.

iv. By virtue of its direct exposure to the air stream, the light assembly provides improved radiation of internally generated waste heat compared to previous approaches, thus allowing the LEDs contained therein to operate at greater efficiency and thus provide greater luminous intensity for a given physical size.

v. When installed, the exterior shape or profile of the invention matches that of existing light fixture lenses, thus causing no change in airfoil and/or aerodynamic characteristics of an aircraft on which it is installed.

vi. Covert emissions are visible only from locations level with and above the aircraft, and different selectable flash characteristics in covert mode facilitate recognition of different aircraft with NVGs at long ranges, without modification of the aircraft electrical system.

vii. Preprogramming of appropriate voltage levels allows adaptation of the light unit to different aircraft electronics, and also allows multiple different covert infra-red flash characteristics to be set up in the unit before used using a hand-held programming tool.

The light assembly is not limited to any single particular shape or size, and its shape, profile and/or configuration may be tailored to match virtually any existing lens and interface with virtually any existing exterior lighting fixture configuration. Lenses on existing external light fixtures typically are secured by at most three screws, and the lamp within said fixtures typically is mounted via a simple twist-lock bayonet base shown in the embodiments herein, so through the simple expedient of its substitution for the existing lenses and lamps, the invention provides implementation of visible-only or dual mode lighting for aircraft requiring such external lighting more rapidly and at less expense than any other known approach, using the existing fixtures if desired.

An assembly according to the invention also may be implemented as a 'new start' design for exterior light fixtures, where its configuration is original, and it need not duplicate the profile of an existing lens or fit an existing fixture. In whatever the application, however, the light assembly according to the invention preferably has an outer surface that is conformal to the outer contour of the aircraft body on at least one edge, e.g., the leading edge of the assembly meaning that the outer surface of the assembly smoothly merges without substantial interruption or discontinuity into the contour of the outer surface of the aircraft body adjacent thereto.

An additional way to reduce the heat from the LEDs (or the arrays of LEDs) while maintaining an adequate brightness standard is accomplished using a brightness enhancement effect produced by flashing. All of the LEDs of the fixture are flashed on and off together at a rate of 10 HZ to 20 Hz, and most preferably at a rate of 12 to 15 Hz so as to produce the psycho-optical effect known as brightness enhancement, which makes a human see such flashing lights as brighter than if they were on 100% of the time. Since the LEDs produce no heat for the portion of the cycle during which they are off, this reduces the amount of heat that must be dissipated, while providing a perceptibly similar level of brightness.

It will be understood that the invention herein extends well beyond the embodiments of the disclosure, and the terms used in this specification should be understood to be language of description, not limitation, as those of skill in the art with this specification before them will be able to make changes and modifications therein without departing from the scope of the invention.

What is claimed is:

1. A dual mode light unit for an aircraft, said unit comprising:
    light control circuitry configured to be operatively connected with wiring connecting with pilot interface circuitry so as to receive an electrical current therefrom,
    a visible navigational light source connected with the light control circuitry, and
    an infrared light source connected with the light control circuitry,
    said light control circuitry, when the electrical current is in a first electrical state, supplying power to the visible navigational light source and, when the electrical current is in a second state, causing the visible light source to produce substantially no visible light and supplying power to the infrared light source so that the infrared light source pulses in a first time dependent pattern, and said pattern having pulses or intervals between pulses of two or more different durations.

2. The dual mode light unit of claim 1 wherein the aircraft wiring includes a socket and the unit includes a connector base structure configured to be received in the socket on the aircraft and to receive the electric current through the socket.

3. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 2.

4. The dual mode light unit of claim 1 wherein the light control circuitry is configured to receive current having a varying voltage, said first and second electrical states of the current being first and second voltages thereof.

5. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 4.

6. The dual mode light unit of claim 4 wherein the light control circuitry is configured to receive AC current having a varying voltage.

7. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 6.

8. The dual mode light unit of claim 1 wherein said flash pattern is cyclically repeated.

9. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 8.

10. The dual mode light unit of claim 1 wherein the light control circuitry, responsive to the current being in a third electrical state, causes the infrared light source to pulse in a second time dependent pattern different from the first pattern.

11. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 10.

12. The dual mode light unit of claim 10 wherein the light control circuitry is configured to receive current having a varying voltage, said first, second, and third electrical states of the current being respective voltages thereof.

13. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 12.

14. The dual mode light unit of claim 10 wherein the light control circuitry has an input through which a user can program the circuitry to select or define the flash patterns or to select the electrical states to which the circuitry responds.

15. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 14.

16. The dual mode light unit of claim 1 wherein said visible light source comprises a set of LEDs supported in the unit and connected with the light control circuitry.

17. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 15.

18. The dual mode light unit of claim 16 wherein the light unit is configured to be secured in a space in a body of the aircraft,
    said light unit including a metallic portion exposed to external airflow when in said space, and
    the LEDs being thermally linked to the metallic portion such that heat generated by the LEDs flows to the metal portion and is dissipated to the airflow such that the LEDs remain at temperatures within an operational temperature range thereof.

19. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 18.

20. The dual mode light unit of claim 18 wherein the metallic portion supports a window member through which light from the LEDs can pass, said window and metallic portion closing said space against said external airflow over the aircraft body.

21. The dual mode light unit of claim 20, wherein the light control circuitry illuminates the LEDs by supplying to said LEDs an electrical power current derived from the electrical current received from the aircraft electrical system.

22. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 21.

23. The dual mode light unit of claim 20 wherein said window and metallic portion define an outer surface that is conformal to an outer contour of the aircraft body.

24. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 23.

25. The dual mode light unit of claim 20 wherein said metallic portion and the window form a structure that has an engagement structure engaging the aircraft body for securing the unit in said space and that emulates an engagement portion and outer contour of a lens used to cover the space when an incandescent light source is used for in the space as the navigational light source.

26. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:
    removing the navigational light from the aircraft; and
    inserting in said socket a dual mode light unit according to claim 25.

27. The dual mode light unit of claim 20 wherein said metallic portion and the window form a structure that has an engagement structure engaging the aircraft body for securing the unit in said space and that emulates an engagement portion and outer contour of a lens used to cover the space when an incandescent light source is used for in the space as the navigational light source together with a securement member that secures the lens in position over said space.

28. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:

removing the navigational light from the aircraft; and
inserting in said socket a dual mode light unit according to claim 27.

29. The dual mode light unit of claim 20 wherein said metallic portion includes a frame structure in which the window is securingly retained.

30. The dual mode light unit of claim 29 wherein said window is symmetrical and the frame structure receives the window in a symmetrical aperture therein.

31. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:

removing the navigational light from the aircraft; and
inserting in said socket a dual mode light unit according to claim 30.

32. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:

removing the navigational light from the aircraft; and
inserting in said socket a dual mode light unit according to claim 29.

33. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:

removing the navigational light from the aircraft; and
inserting in said socket a dual mode light unit according to claim 20.

34. The dual mode light unit of claim 1, and the light control circuitry including circuitry detecting whether the current has a voltage that is above a preselected threshold voltage level, and responsive to such a detection causes the light unit to operate in a visible mode wherein power is supplied to the visible light source.

35. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:

removing the navigational light from the aircraft; and
inserting in said socket a dual mode light unit according to claim 34.

36. The dual mode light unit of claim 1, and the light control circuitry, where the current has a voltage that is lower than a preselected threshold voltage level, operating the dual mode light unit in a covert mode wherein the light unit generates no visible light and power is supplied only to the infrared light source.

37. The dual mode light unit of claim 36 wherein the light control circuitry has an input through which a user can program the circuitry to define the threshold voltage level.

38. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:

removing the navigational light from the aircraft; and
inserting in said socket a dual mode light unit according to claim 37.

39. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:

removing the navigational light from the aircraft; and
inserting in said socket a dual mode light unit according to claim 36.

40. A method of providing an infrared light source to an aircraft having a navigational light connected with an electrical system supplying electric current thereto, the current being in one of a plurality of electrical states, and the aircraft having a pilot-accessible control therein responsive to which the pilot can selectively cause the current to change to a different electrical state for adjusting brightness of the navigation light, said method comprising:

removing the navigational light from the aircraft; and
inserting in said socket a dual mode light unit according to claim 1.

41. The method of claim 40 wherein the navigational light initially is in a socket covered by a lens held in place by a securement plate fastened to the body of the aircraft and overlying the lens, said dual mode light unit having a configuration that emulates the shape of the lens, the method further comprising unfastening the securement plate from a mounting location thereof on the aircraft body;
removing the lens from a mounting location thereof on the aircraft body;
setting the dual mode light unit in the mounting location; and
fastening the securement plate over the dual mode light unit.

42. The method of claim 40 wherein the navigational light initially is in a socket covered by a lens held in place by a securement plate fastened to the body of the aircraft and overlying the lens, said dual mode light unit having a configuration that emulates the shape of the lens combined with the securement plate, the method further comprising unfastening the securement plate from a mounting location thereof on the aircraft body;

removing the lens from a mounting location thereof on the aircraft body;
setting the dual mode light unit in the mounting locations of the securement plate and the lens; and fastening the dual mode light unit in said mounting location.

43. The method of claim 42 wherein the securement plate is fastened to the aircraft body by a bolt extending through a conforming passage therein, the dual mode light unit having a securement passage that matches the conforming passage of the securement plate, and the step of fastening the dual mode light unit includes extending the bolt or a matching replacement bolt through the securement passage in said dual mode light unit and fastening the bolt to said aircraft body.

44. An aircraft light unit for placement in a space for a navigation light in a body of an aircraft through an opening, said aircraft having an electrical system supplying an electrical current to a socket in the space, said light unit comprising:

an electrical connector configured to be received in the socket and to electrically connect therewith so as to receive said electrical current;

circuitry connected with said electrical connector and receiving the electrical current therefrom;

a light unit housing configured to be supported on the aircraft body in the space and closing said opening; and at least one visible light LED supported in the housing and being connected with the circuitry and receiving electrical power therefrom so that the LED emits visible light;

the housing including an outer portion over said opening and over the LED, said outer portion having a light transmissive member through which the visible light from the LED can pass, and a thermally conductive metal outer member supporting the light transmissive member over the LED;

said metal outer member and said light transmissive member defining an outer surface of the housing that is conformal to a contour of the body of the aircraft;

the LED having a thermal link to the metal outer member that carries heat from the LED to the metal outer member, the metal outer member having a metallic outer surface with a surface area large enough and the thermal link having sufficient thermal conductivity such that heat from the LED is dissipated into air flowing over the outer portion so as to keep the LED in an operational temperature range thereof.

45. The aircraft light unit of claim 44 wherein the electrical connector is a bayonet fixture.

46. The aircraft light unit of claim 45 wherein the circuitry is supported in the housing and the bayonet fixture is connected to the circuitry by a flexible electrical cable.

47. A method of installing a navigational light to an aircraft having wiring supplying electric current in one of a plurality of electrical states to a navigational light on the aircraft, said method comprising:

removing the navigational light from the aircraft; and
connecting a light unit according to claim 46 to the wiring of said aircraft.

48. A method of installing a navigational light to an aircraft having wiring supplying electric current in one of a plurality of electrical states to a navigational light on the aircraft, said method comprising:

removing the navigational light from the aircraft; and
connecting a light unit according to claim 45 to the wiring of said aircraft.

49. The aircraft light unit of claim 44 wherein the electrical current is alternating current and the circuitry converts the alternating current to DC current at an appropriate voltage for the LED and transmits the DC current to the LED.

50. A method of installing a navigational light to an aircraft having wiring supplying electric current in one of a plurality of electrical states to a navigational light on the aircraft, said method comprising:

removing the navigational light from the aircraft; and
connecting a light unit according to claim 49 to the wiring of said aircraft.

51. The aircraft light unit of claim 44 wherein the metal outer member has a frame structure that holds the transmissive member.

52. The aircraft light unit of claim 51 wherein the transmissive member is symmetrical across a center plane thereof.

53. A method of installing a navigational light to an aircraft having wiring supplying electric current in one of a plurality of electrical states to a navigational light on the aircraft, said method comprising:

removing the navigational light from the aircraft; and
connecting a light unit according to claim 52 to the wiring of said aircraft.

54. A method of installing a navigational light to an aircraft having wiring supplying electric current in one of a plurality of electrical states to a navigational light on the aircraft, said method comprising:

removing the navigational light from the aircraft; and
connecting a light unit according to claim 51 to the wiring of said aircraft.

55. The aircraft light unit of claim 44 wherein the outer surface of the light unit emulates an outer surface of a lens or an outer surface a lens in combination with a securement member used for covering the opening in the aircraft body when an incandescent bulb is used as a navigation light in the space.

56. A method of installing a navigational light to an aircraft having wiring supplying electric current in one of a plurality of electrical states to a navigational light on the aircraft, said method comprising:

removing the navigational light from the aircraft; and
connecting a light unit according to claim 55 to the wiring of said aircraft.

57. The aircraft light unit of claim 44 wherein the thermal link includes a metallic mounting structure on which the LED is mounted so as to transmit heat thereto, the mounting structure engaging the metal outer member.

58. A method of installing a navigational light to an aircraft having wiring supplying electric current in one of a plurality of electrical states to a navigational light on the aircraft, said method comprising:

removing the navigational light from the aircraft; and
connecting a light unit according to claim 57 to the wiring of said aircraft.

59. The aircraft light unit of claim 57 wherein the mounting structure and the metal outer member are of aluminum.

60. A method of installing a navigational light to an aircraft having wiring supplying electric current in one of a plurality of electrical states to a navigational light on the aircraft, said method comprising:

removing the navigational light from the aircraft; and
connecting a light unit according to claim 59 to the wiring of said aircraft.

61. A method of installing a navigational light to an aircraft having wiring supplying electric current in one of a plurality of electrical states to a navigational light on the aircraft, said method comprising:

removing the navigational light from the aircraft; and
connecting a light unit according to claim 44 to the wiring of said aircraft.

62. The method of claim 61 wherein the navigational light initially is in a socket covered by a lens held in place by a securement plate fastened to the body of the aircraft and overlying the lens, said light assembly having a configuration that emulates the shape of the lens, the method further comprising
  unfastening the securement plate from a mounting location thereof on the aircraft body;
  removing the lens from a mounting location thereof on the aircraft body;
  setting the assembly in the mounting location; and
  fastening the securement plate over the assembly.

63. The method of claim 61 wherein the aircraft initially has a navigational light in the socket covered by a lens held in place by a securement plate fastened to the body of the aircraft and overlying the lens, said light assembly having a configuration that emulates the shape of the lens combined with the securement plate, the method further comprising
  unfastening the securement plate from a mounting location thereof on the aircraft body;
  removing the lens from a mounting location thereof on the aircraft body;
  setting the assembly in the mounting locations of the securement plate and the lens; and
  fastening the assembly in said mounting location.

64. The method of claim 63 wherein the securement plate is fastened to the aircraft body by a bolt extending through a conforming passage therein, the assembly having a securement passage that matches the conforming passage of the securement plate, and
  the step of fastening the assembly includes extending the bolt or a matching replacement bolt through the securement passage in said light assembly and fastening the bolt to said aircraft body.

65. The aircraft light unit of claim 44 wherein an infra red emitter is connected with the circuitry, and said circuitry includes discriminator circuitry that determines from a characteristic of the electrical current whether the unit is selected for a visible light mode or a covert IR mode, and illuminates the LED for visible mode, and illuminates the infra red emitter for covert IR mode.

66. The aircraft light unit of claim 65 wherein the circuitry has an input through which a user can program the circuitry to set the characteristic that is used by the discriminator circuitry.

67. A method of installing a navigational light to an aircraft having wiring supplying electric current in one of a plurality of electrical states to a navigational light on the aircraft, said method comprising:
  removing the navigational light from the aircraft; and
  connecting a light unit according to claim 66 to the wiring of said aircraft.

68. A method of installing a navigational light to an aircraft having wiring supplying electric current in one of a plurality of electrical states to a navigational light on the aircraft, said method comprising:
  removing the navigational light from the aircraft; and
  connecting a light unit according to claim 65 to the wiring of said aircraft.

69. An aircraft light assembly for an aircraft, said aircraft having a body with an outer surface exposed to an external airflow over the aircraft, said aircraft light assembly comprising:
  a visible light apparatus configured to be supported on the body of the aircraft, said apparatus including one or more light emitting diode devices generating visible light; and
  an outer structure overlying the light emitting diode devices, said outer structure having a light transmissive portion through which visible light from the light emitting diode devices can pass, and a metallic portion connected with the light transmissive portion and securing said light transmissive portion on the aircraft,
  said metallic portion having an outer surface exposed to the external airflow; and
  the light emitting diode devices being thermally linked to said metallic portion so that heat created in the light emitting diode devices flows to the outer surface of the metallic portion and is dissipated into the external airflow.

70. The aircraft light assembly of claim 69 wherein the aircraft body has edges defining an aperture in the outer surface of the aircraft body providing access to a space in the body of the aircraft,
  said visible light apparatus being configured to be received in said space, and said outer structure being configured to engage the edges of the aperture on the aircraft body and to cover the aperture and enclose the space.

71. A method of installing navigational lighting on an aircraft having an electrical system supplying electric current to a navigational light on the aircraft, said method comprising:
  removing the navigational light from the aircraft; and
  connecting a light assembly according to claim 70 in place thereof.

72. The aircraft light assembly of claim 70 wherein said outer structure has an outer surface conformal with the outer surface of the aircraft body.

73. A method of installing navigational lighting on an aircraft having an electrical system supplying electric current to a navigational light on the aircraft, said method comprising:
  removing the navigational light from the aircraft; and
  connecting a light assembly according to claim 72 in place thereof.

74. The aircraft light assembly of claim 70 wherein said outer structure has an outer surface that duplicates an outer surface of a lens or lens assembly used to cover said aperture when an incandescent bulb is used as a navigational light in the space.

75. A method of installing navigational lighting on an aircraft having an electrical system supplying electric current to a navigational light on the aircraft, said method comprising:
  removing the navigational light from the aircraft; and
  connecting a light assembly according to claim 74 in place thereof.

76. The aircraft light assembly of claim 70 wherein the assembly includes circuitry adapted to receive electrical current from an electrical system of the aircraft, said circuitry conditioning said electrical current and transmitting electrical power therefrom to the light emitting diode devices so as to cause illumination thereof.

77. The aircraft light assembly of claim 76 wherein the assembly includes an electrical connector connected with the circuitry and adapted to be secured in a socket in the aircraft electrical system in said space.

78. A method of installing navigational lighting on an aircraft having an electrical system supplying electric current to a navigational light on the aircraft, said method comprising:

removing the navigational light from the aircraft; and
connecting a light assembly according to claim 77 in place thereof.

79. A method of installing navigational lighting on an aircraft having an electrical system supplying electric current to a navigational light on the aircraft, said method comprising:
removing the navigational light from the aircraft; and
connecting a light assembly according to claim 76 in place thereof.

80. The aircraft light assembly of claim 70 wherein the outer structure of the assembly is configured to emulate an outer surface and engagement structure of a lens assembly used to cover the aperture, the engagement structure of the lens assembly including a securement plate secured overlying a lens that covers the aperture when an incandescent bulb is used as a light source therein, and a fastener or bolt engaging and securing the securement plate to the aircraft body, said fastener engaging and securing the outer portion of the aircraft light assembly to the aircraft body when installed thereon.

81. A method of installing navigational lighting on an aircraft having an electrical system supplying electric current to a navigational light on the aircraft, said method comprising:
removing the navigational light from the aircraft; and
connecting a light assembly according to claim 80 in place thereof.

82. A method of installing navigational lighting on an aircraft having an electrical system supplying electric current to a navigational light on the aircraft, said method comprising:
removing the navigational light from the aircraft; and
connecting a light assembly according to claim 69 in place thereof.

83. The method of claim 80 wherein the navigational light initially is in a socket covered by a lens held in place by a securement plate fastened to the body of the aircraft and overlying the lens, said light assembly having a configuration that emulates the shape of the lens, the method further comprising
unfastening the securement plate from a mounting location thereof on the aircraft body;
removing the lens from a mounting location thereof on the aircraft body;
setting the assembly in the mounting location; and
fastening the securement plate over the assembly.

84. The method of claim 82 wherein the aircraft initially has a navigational light in the socket covered by a lens held in place by a securement plate fastened to the body of the aircraft and overlying the lens, said light assembly having a configuration that emulates the shape of the lens combined with the securement plate, the method further comprising
unfastening the securement plate from a mounting location thereof on the aircraft body;
removing the lens from a mounting location thereof on the aircraft body;
setting the assembly in the mounting locations of the securement plate and the lens; and
fastening the assembly in said mounting location.

85. The method of claim 84 wherein the securement plate is fastened to the aircraft body by a bolt extending through a conforming passage therein, the assembly having a securement passage that matches the conforming passage of the securement plate, and
the step of fastening the assembly includes extending the bolt or a matching replacement bolt through the securement passage in said light assembly and fastening the bolt to said aircraft body.

* * * * *